(12) United States Patent
Ordentlich et al.

(10) Patent No.: US 8,189,722 B2
(45) Date of Patent: May 29, 2012

(54) DISCRETE DENOISING USING BLENDED COUNTS

(75) Inventors: Erik Ordentlich, San Jose, CA (US);
Gadiel Seroussi, Cupertino, CA (US);
Sergio Verdú, Princeton, NJ (US);
Marcelo Weinberger, San Jose, CA (US); Itschak Weissman, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/955,860

(22) Filed: Nov. 29, 2010

(65) Prior Publication Data

US 2011/0129046 A1    Jun. 2, 2011

Related U.S. Application Data

(63) Continuation-in-part of application No. 10/933,643, filed on Sep. 2, 2004.

(51) Int. Cl.
*H03D 1/06* (2006.01)
*H03K 5/01* (2006.01)

(52) U.S. Cl. .................. 375/346; 375/226; 375/227

(58) Field of Classification Search .................. 375/346, 375/347, 348, 358; 714/755, 704; 702/191; 341/107
See application file for complete search history.

(56) References Cited

U.S. PATENT DOCUMENTS

| | | | |
|---|---|---|---|
| 7,420,487 B2 * | 9/2008 | Verdu et al. .................. 341/107 |
| 7,483,685 B2 * | 1/2009 | Lewis ........................... 455/296 |
| 7,769,075 B2 * | 8/2010 | Hosseinian et al. .......... 375/140 |
| 2004/0190655 A1 * | 9/2004 | Chung et al. .................. 375/346 |
| 2006/0008028 A1 | 1/2006 | Maltsev et al. |
| 2007/0036223 A1 | 2/2007 | Srinivasan |

* cited by examiner

*Primary Examiner* — Kenneth Lam
*Assistant Examiner* — Qutbuddin Ghulamali

(57) ABSTRACT

Various embodiments of the present invention relate to a discrete denoiser that replaces symbols in a received, noisy signal with replacement symbols in order to produce a recovered signal less distorted with respect to an originally transmitted, clean signal than the received, noisy signal. Certain, initially developed discrete denoisers employ an analysis of the number of occurrences of metasymbols within the received, noisy signal in order to select symbols for replacement, and to select the replacement symbols for the symbols that are replaced. Denoisers that represent examples of the present invention use blended counts that are combinations of the occurrences of metasymbol families within a noisy signal to determine the symbols to be replaced and the replacement symbols corresponding to them.

22 Claims, 18 Drawing Sheets

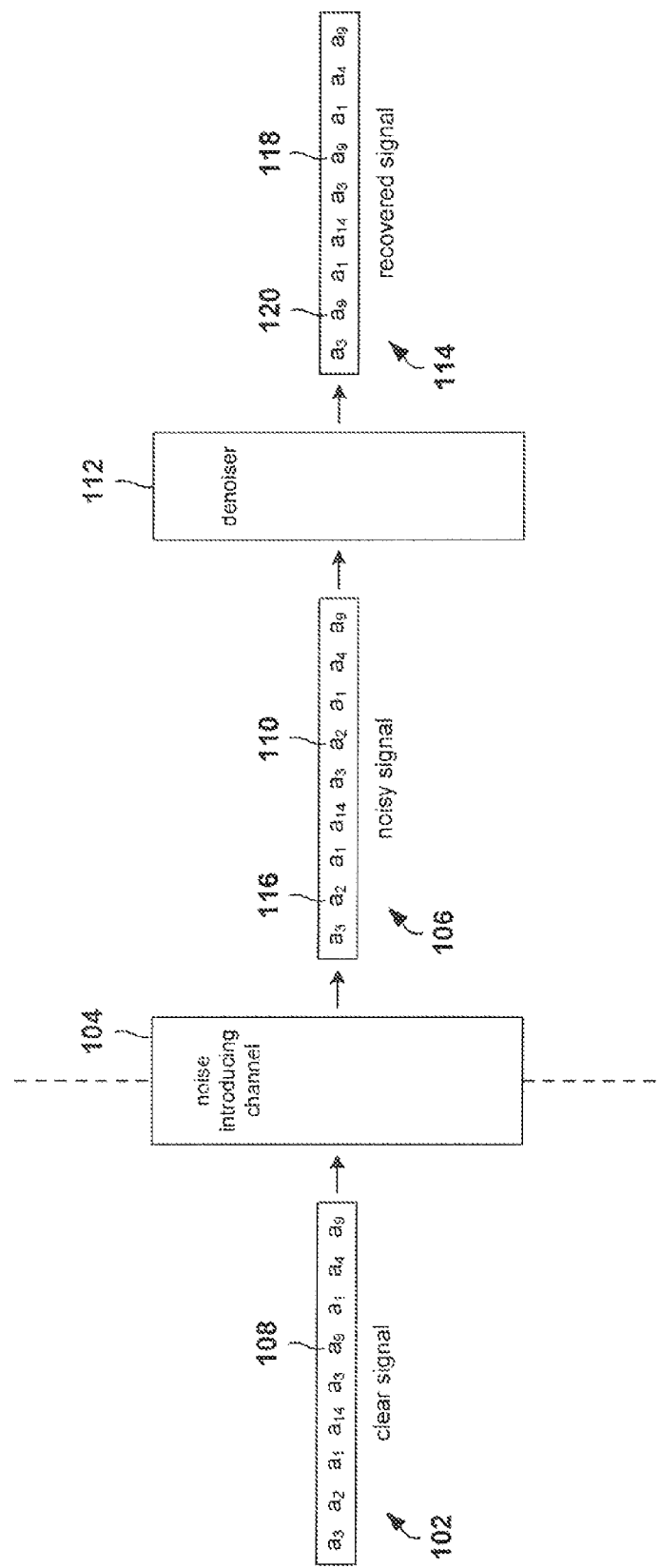

$$\Pi = \begin{bmatrix} \pi_1 & \pi_2 & \pi_3 & \cdots & \pi_n \\ Pa_1 \rightarrow a_1 & Pa_1 \rightarrow a_2 & Pa_1 \rightarrow a_3 & \cdots & Pa_1 \rightarrow a_n \\ Pa_2 \rightarrow a_1 & Pa_2 \rightarrow a_2 & Pa_2 \rightarrow a_3 & \cdots & Pa_2 \rightarrow a_n \\ Pa_3 \rightarrow a_1 & Pa_3 \rightarrow a_2 & Pa_3 \rightarrow a_3 & \cdots & Pa_3 \rightarrow a_n \\ \vdots & \vdots & \vdots & & \vdots \\ Pa_n \rightarrow a_1 & Pa_n \rightarrow a_2 & Pa_n \rightarrow a_3 & \cdots & Pa_n \rightarrow a_n \end{bmatrix}$$

| 0 | 0 | 255 | 255 | 10 | 0 | 0 |
|---|---|---|---|---|---|---|
| 0 | 0 | 255 | 0 | 10 | 0 | 0 |
| 18 | 0 | 255 | 0 | 255 | 0 | 0 |
| 0 | 0 | 255 | 255 | 125 | 0 | 0 |
| 0 | 0 | 255 | 0 | 0 | 0 | 6 |
| 0 | 0 | 251 | 0 | 0 | 0 | 0 |
| 0 | 223 | 255 | 0 | 0 | 0 | 0 |

$$\begin{array}{cccccc}
\lambda_1 & \lambda_2 & \lambda_3 & \cdots & \lambda_n \\
\end{array}$$

$$\begin{bmatrix}
da_1 \to a_1 & da_1 \to a_2 & da_1 \to a_3 & \cdots & da_1 \to a_n \\
da_2 \to a_1 & da_2 \to a_2 & da_2 \to a_3 & \cdots & da_2 \to a_n \\
da_3 \to a_1 & da_3 \to a_2 & da_3 \to a_3 & \cdots & da_3 \to a_n \\
\vdots & \vdots & \vdots & & \vdots \\
da_n \to a_1 & da_n \to a_2 & da_n \to a_3 & \cdots & da_n \to a_n \\
\end{bmatrix}$$

$\Lambda$

FIGURE 6

$$\underbrace{\begin{bmatrix} da_1 \to a_x \\ da_2 \to a_x \\ \vdots \\ da_n \to a_x \end{bmatrix}}_{\lambda_{a_x}} \odot \underbrace{\begin{bmatrix} Pa_1 \to a_\alpha \\ Pa_2 \to a_\alpha \\ Pa_3 \to a_\alpha \\ \vdots \\ Pa_n \to a_\alpha \end{bmatrix}}_{\pi_{a_\alpha}} = \underbrace{\begin{bmatrix} da_1 \to a_x \; Pa_1 \to a_\alpha \\ da_2 \to a_x \; Pa_2 \to a_\alpha \\ da_3 \to a_x \; Pa_3 \to a_\alpha \\ \vdots \\ da_n \to a_x \; Pa_n \to a_\alpha \end{bmatrix}}_{\lambda_{a_x} \odot \pi_{a_\alpha}}$$

FIGURE 7

$$q^T(s_{noisy}, s_{clear}, b, c) \quad \times \quad [\lambda_{a_x} \odot \pi_{a_c}] \quad = \quad \text{distortion expected for replacing } a_v \text{ in } ba_vc \text{ in } s_{noisy} \text{ by } a_x$$

FIGURE 8

| 361 | 7 | 321 | 14 | 81 | 25 |

$m^T(s_{noisy}, b, c)$ $\times \quad [\Pi^{-1}] \quad \cong$

| 325 | 18 | 340 | 16 | 41 | 30 |

$q^T(s_{noisy}, s_{clear}, b, c)$

FIGURE 9

DISCRETE DENOISING USING BLENDED COUNTS

CROSS-REFERENCE TO RELATED APPLICATION

This application is a continuation-in-part of application Ser. No. 10/933,643, filed Sep. 2, 2004.

TECHNICAL FIELD

The present invention is related to methods and systems for denoising noisy signals received from noise-introducing channels and, in particular, to discrete, denoising methods and systems that employ blended counts of similar metasymbols for estimating distortions produced by substituting one symbol for another symbol in order to produce a recovered signal from a received, noisy signal.

BACKGROUND

A large body of mathematical and computational techniques has been developed in the area of reliable signal transmission through noise-introducing channels. These different techniques depend on assumptions made with regard to the noise-introducing channel, as well as on the amount and nature of information available, during denoising, regarding the original signal. The denoising process may be characterized by various computational efficiencies, including the time complexity and working-data-set complexity for a particular computational method, as well as by the amount of distortion, or noise, remaining in a recovered signal following denoising with respect to the originally transmitted, clean signal. Although methods and systems for denoising noisy signals have been extensively studied, and signal denoising is a relatively mature field, developers, vendors, and users of denoising methods and systems, and of products that rely on denoising, continue to recognize the need for improved denoising techniques.

BRIEF DESCRIPTION OF THE DRAWINGS

FIG. 1 illustrates introduction of noise into a clean signal to produce a noisy signal and subsequent denoising of the noisy signal to produce a recovered signal.

FIGS. 2A-D illustrate a motivation for a discrete denoiser related to characteristics of the noise-introducing channel.

FIG. 6 displays one form of the symbol-transformation distortion matrix $\Lambda$.

FIG. 7 illustrates computation of the relative distortion expected from replacing a symbol "$a_\alpha$" in a received, noisy signal by the symbol "$a_x$."

FIG. 8 illustrates use of the column vector $\lambda_{a_x} \odot \pi_{a_\alpha}$ to compute a distortion expected for replacing the center symbol $a_\alpha$ in the metasymbol $ba_\alpha c$ noisy signal "$s_{noisy}$" by the replacement symbol $a_x$.

FIG. 9 shows estimation of the counts of the occurrences of symbols "$a_1$"-"$a_n$" for the clean signal.

DETAILED DESCRIPTION

Figure 2A:
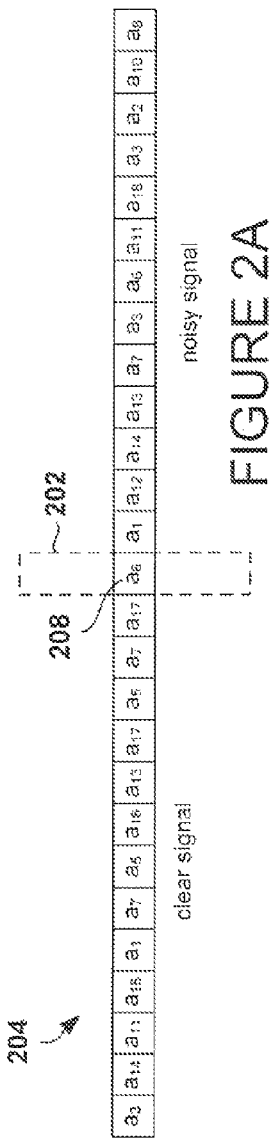

Certain aspects of the present invention are related to denoising methods and systems, and in particular, to discrete denoising systems and methods. A discrete denoising method, referred to as "DUDE," is described, below, in a first subsection, followed by a discussion, in a second subsection, of methods that use blended counts that are combinations of the occurrences of metasymbol families within a noisy signal to determine symbols to be replaced and the replacement symbols with which they are replaced.

Dude

FIG. 1 illustrates introduction of noise into a clean signal to produce a noisy signal and subsequent denoising of the noisy signal to produce a recovered signal. In FIG. 1, signals are represented as sequences of symbols that are each members of an alphabet A having n distinct symbols, where A is:

$$A = (a_1, a_2, a_3, \ldots a_n)$$

Note that the subscripts refer to the positions of the respective symbols within an ordered listing of the different symbols of the alphabet, and not to the positions of symbols in a signal. In FIG. 1, an initial, clean signal 102 comprises an ordered sequence of nine symbols from the alphabet A. In normal circumstances, an input signal would generally have thousands, millions, or more symbols. The short input signal 102 is used for illustrative convenience.

The clean signal 102 is transmitted or passed through a noise-introducing channel 104, producing a noisy signal 106. In the example shown in FIG. 1, the output signal 106 comprises symbols from the same alphabet as the input signal 102, although, in general, the input symbols may be chosen from a different, equally sized or smaller alphabet than that from which the output symbols are selected. In the example shown in FIG. 1, the sixth symbol in the clean signal 108, "$a_9$," is altered by the noise-introducing channel to produce the symbol "$a_2$" 110 in the noisy signal 106. There are many different types of noise-introducing channels, each type characterized by the types and magnitudes of noise that the noise-introducing channel introduces into a clean signal. Examples of noise-introducing channels include electronic communications media, data storage devices to which information is transferred and from which information is extracted, and transmission and reception of radio and television signals. In this discussion, a signal is treated as a linear, ordered sequence of symbols, such as a stream of alphanumeric characters that comprise a text file, but the actual data into which noise is introduced by noise-introducing channels in real world situations may include two-dimensional images, audio signals, video signals, and other types of displayed and broadcast information.

In order to display, broadcast, or store a received, noisy signal with reasonable fidelity with respect to the initially transmitted clean signal, a denoising process may be undertaken to remove noise introduced into the clean signal by a noise-introducing channel. In FIG. 1, the noisy signal 106 is passed through, or processed by, a denoiser 112 to produce a recovered signal 114 which, when the denoising process is effective, is substantially closer to, or more perceptually similar to, the originally transmitted clean signal than to the received noisy signal.

Many types of denoisers have been proposed, studied, and implemented. Some involve application of continuous mathematics, some involve detailed knowledge of the statistical properties of the originally transmitted clean signal, and some rely on detailed information concerning time and sequence-dependent behavior of the noise-introducing channel. The following discussion describes a discrete denoiser, referred to as "DUDE," related to the present invention. The DUDE is discrete in the sense that the DUDE processes signals comprising discrete symbols using a discrete algorithm, rather than continuous mathematics. The DUDE is universal in that it asymptotically approaches the performance of an optimum denoiser employing knowledge of the clean-signal symbol-occurrence distributions without access to these distributions.

The DUDE implementation is motivated by a particular noise-introducing-channel model and a number of assumptions. These are discussed below. However, DUDE may effectively function when the model and assumptions do not, in fact, correspond to the particular characteristics and nature of a noise-introducing channel. Thus, the model and assumptions motivate the DUDE approach, but the DUDE has a much greater range of effectiveness and applicability than merely to denoising signals corrupted by a noise-introducing channel corresponding to the motivating model and assumptions.

As shown in FIG. 1, the DUDE 112 employs a particular strategy for denoising a noisy signal. The DUDE considers each symbol within a context generally comprising one or more symbols preceding and following the symbol according to a left to right ordering. For example, in FIG. 1, the two occurrences of the symbol "$a_2$" in the noisy signal 106 occur within the same single preceding-and-following-symbol context. The full context for the two occurrences of the symbol "$a_2$" in the noisy signal 106 of the example in FIG. 1 is ["$a_3$," "$a_1$"]. The DUDE either leaves all symbols of a particular type "$a_i$" within a particular context unchanged, or changes all occurrences of a particular type of symbol "$a_i$" within a particular context to a different symbol "$a_j$." For example, in FIG. 1, the denoiser has replaced all occurrences of the symbol "$a_2$" 110 and 112 in the noisy signal within the full context ["$a_3$," "$a_1$"] with the symbol "$a_9$" 114 and 116 in the recovered symbol. Thus, the DUDE does not necessarily produce a recovered signal identical to the originally transmitted clean signal, but instead produces a denoised, recovered signal estimated to have less distortion with respect to the clean signal than the noisy signal. In the above example, replacement of the second symbol "$a_2$" 110 with the symbol "$a_9$" 114 restores the originally transmitted symbol at that position, but replacement of the first occurrence of symbol "$a_2$" 112 in the noisy signal with the symbol "$a_9$" 116 introduces a new distortion. The DUDE replaces one symbol with another to produce the recovered signal when the DUDE estimates that the overall distortion of the recovered signal with respect to the clean signal will be less than the distortion of the noisy signal with respect to the clean signal.

FIGS. 2A-D illustrate a motivation for DUDE related to characteristics of the noise-introducing channel. DUDE assumes a memory-less channel. In other words, as shown in FIG. 2A, the noise-introducing channel 202 may be considered to act as a one-symbol window, or aperture, through which a clean signal 204 passes. The noise-introducing channel 202 corrupts a given clean-signal symbol, replacing the given symbol with another symbol in the noisy signal, with an estimateable probability that depends neither on the history of symbols preceding the symbol through the noise-introducing channel nor on the symbols that are subsequently transmitted through the noise-introducing channel.

Figure 2B:
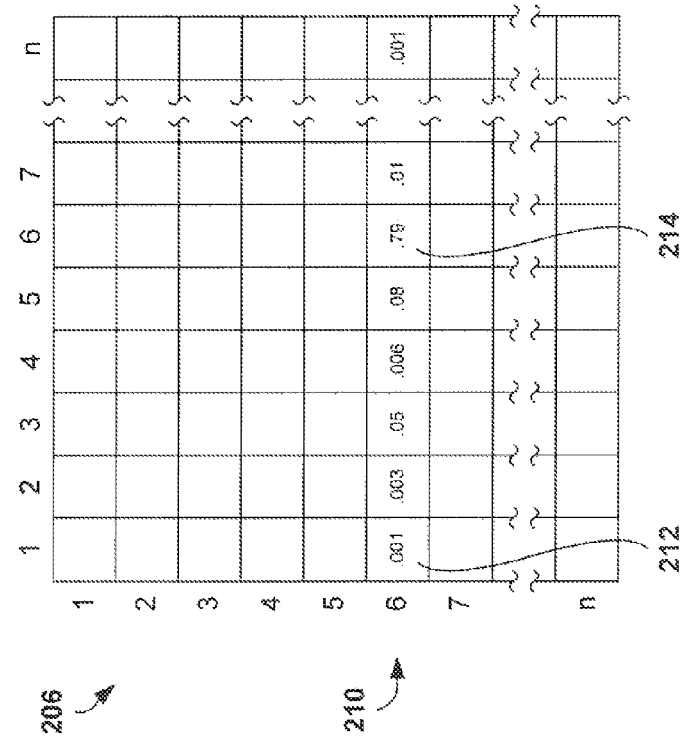

FIG. 2B shows a portion of a table 206 that stores the probabilities that any particular symbol from the alphabet A, "$a_i$," may be corrupted to a symbol "$a_j$" during transmission through the noise-introducing channel. For example, in FIG. 2A, the symbol "$a_6$" 208 is currently passing through the noise-introducing channel. Row 210 in table 206 contains the probabilities that symbol "$a_6$" will be corrupted to each of the different, possible symbols in the alphabet A. For example, the probability that the symbol "$a_6$" will be changed to the symbol "$a_1$" 212 appears in the first cell of row 210 in table 206, indexed by the integers "6" and "1" corresponding to the positions of symbols "$a_6$" and "$a_1$" in the alphabet A. The probability that symbol "$a_6$" will be faithfully transferred, without corruption, through the noise-introducing channel 214 appears in the table cell with indices (6, 6), the probability of symbol "$a_6$" being transmitted as the symbol "$a_6$." Note that the sum of the probabilities in each row of the table 206 is 1.0, since a given symbol will be transmitted by the noise-introducing channel either faithfully or it will be corrupted to some other symbol in alphabet A. As shown in FIG. 2C, table 206 in FIG. 2B can be alternatively expressed as a two-dimensional matrix $\Pi$ 216, with the matrix element identified by indices (i, j) indicating the probability that symbol "$a_i$" will be transmitted by the noise-introducing channel as symbol "$a_j$." Note also that a column j in matrix $\Pi$ may be referred to as "$\pi_j$" or $\pi_{a_j}$.

Figure 2D:
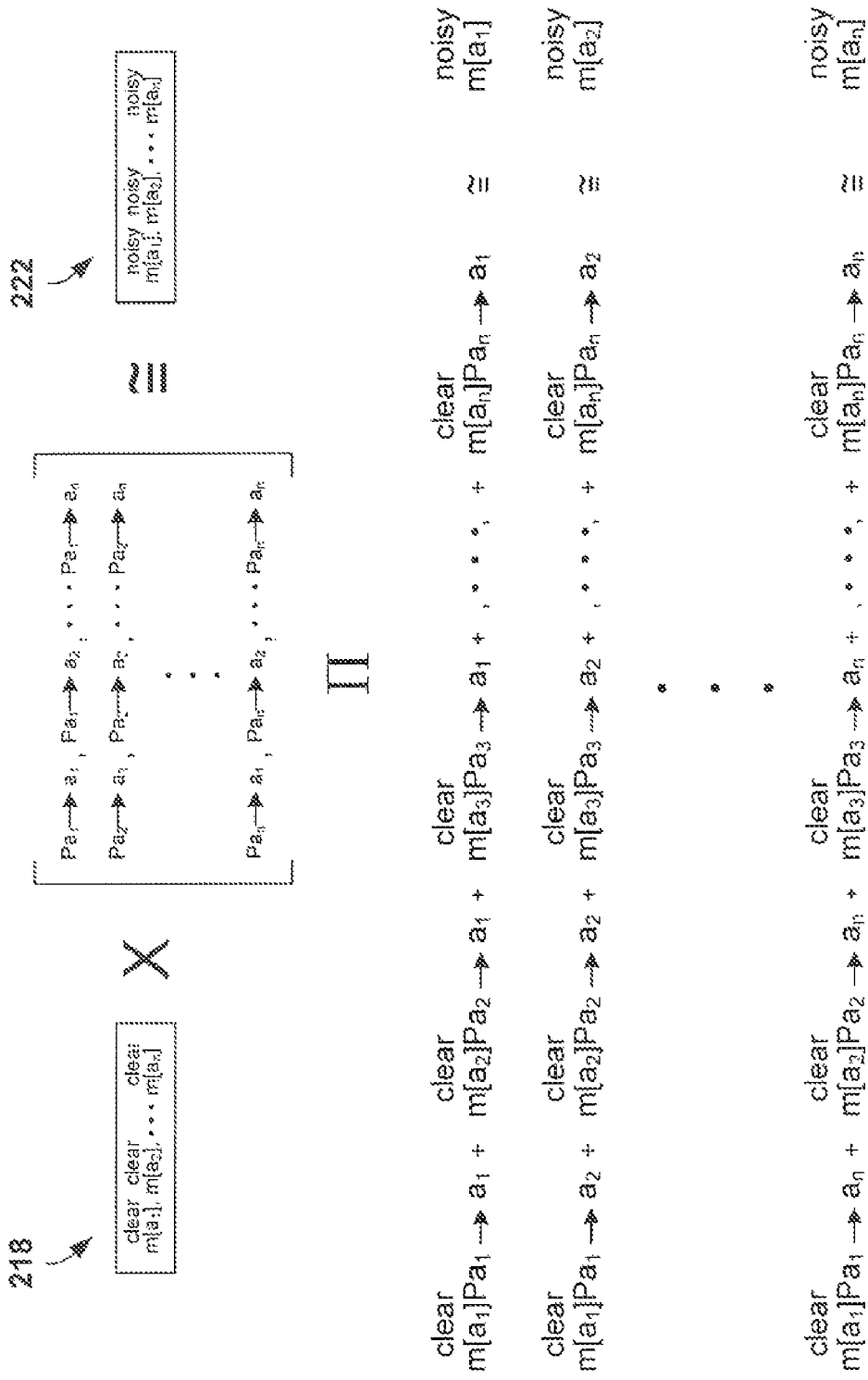

As shown in FIG. 2D, a row vector 218 containing the counts of the number of each type of symbol in the clean signal, where, for example, the number of occurrences of the symbol "$a_5$" in the clean signal appears in the row vector as $m^{clean}[a_5]$, can be multiplied by the symbol-transition-probability matrix $\Pi$ 220 to produce a row vector 222 containing the expected counts for each of the symbols in the noisy signal. The actual occurrence counts of symbols "$a_i$" in the noisy signal appear in the row vector $m^{noisy}$. The matrix multiplication is shown in expanded form 224 below the matrix multiplication in FIG. 2D. Thus, in vector notation:

$$m^{clean}\Pi \approx m^{noisy}$$

where $m^{clean}$ is a row vector containing the occurrence counts of each symbol $a_i$ in alphabet A in the clean signal; and $m^{noisy}$ is a row vector containing the occurrence counts of each symbol $a_i$ in alphabet A in the noisy signal.

The approximation symbol $\approx$ is employed in the above equation, because the probabilities in the matrix $\Pi$ give the expected frequency of a particular symbol substitution, while the actual symbol substitution effected by the noise-introducing channel is random. In other words, the noise-introducing channel behaves randomly, rather than deterministically, and thus may produce different results each time a particular clean signal is transmitted through the noise-introducing channel. The error in the approximation, obtained as the sum of the absolute values of the components of the difference between the left and right sides of the approximation, above, is generally small relative to the sequence length, on the order of the square root of the sequence length. Multiplying, from the right, both sides olde above equation by the inverse of matrix Π, assuming that Π is invertible, allows for calculation of an estimated row-vector count of the symbols in the clean signal, $\hat{m}^{clean}$, from the counts of the symbols in the noisy signal, as follows:

$$\hat{m}^{clean} = m^{noisy}\Pi^{-1}$$

In the case where the noisy symbol alphabet is larger than the clean symbol alphabet, it is assumed that Π is full-row-rank and the inverse in the above expression can be replaced by a generalized inverse, such as the Moore-Penrose generalized inverse.

As will be described below, the DUDE applies clean symbol count estimation on a per-context basis to obtain estimated counts of clean symbols occurring in particular noisy symbol contexts. The actual denoising of a noisy symbol is then determined from the noisy symbol's value, the resulting estimated context-dependent clean symbol counts, and a loss or distortion measure, in a manner described below.

As discussed above, the DUDE considers each symbol in a noisy signal within a context. The context may be, in a 1-dimensional signal, such as that used for the example of FIG. 1, the values of a number of symbols preceding, following, or both preceding and following a currently considered signal. In 2-dimensional or higher dimensional signals, the context may be values of symbols in any of many different types of neighborhoods surrounding a particular symbol. For example, in a 2-dimensional image, the context may be the eight pixel values surrounding a particular, interior pixel. In the following discussion, a 1-dimensional signal is used for examples, but higher dimensional signals can be effectively denoised by the DUDE.

Figure 3A:
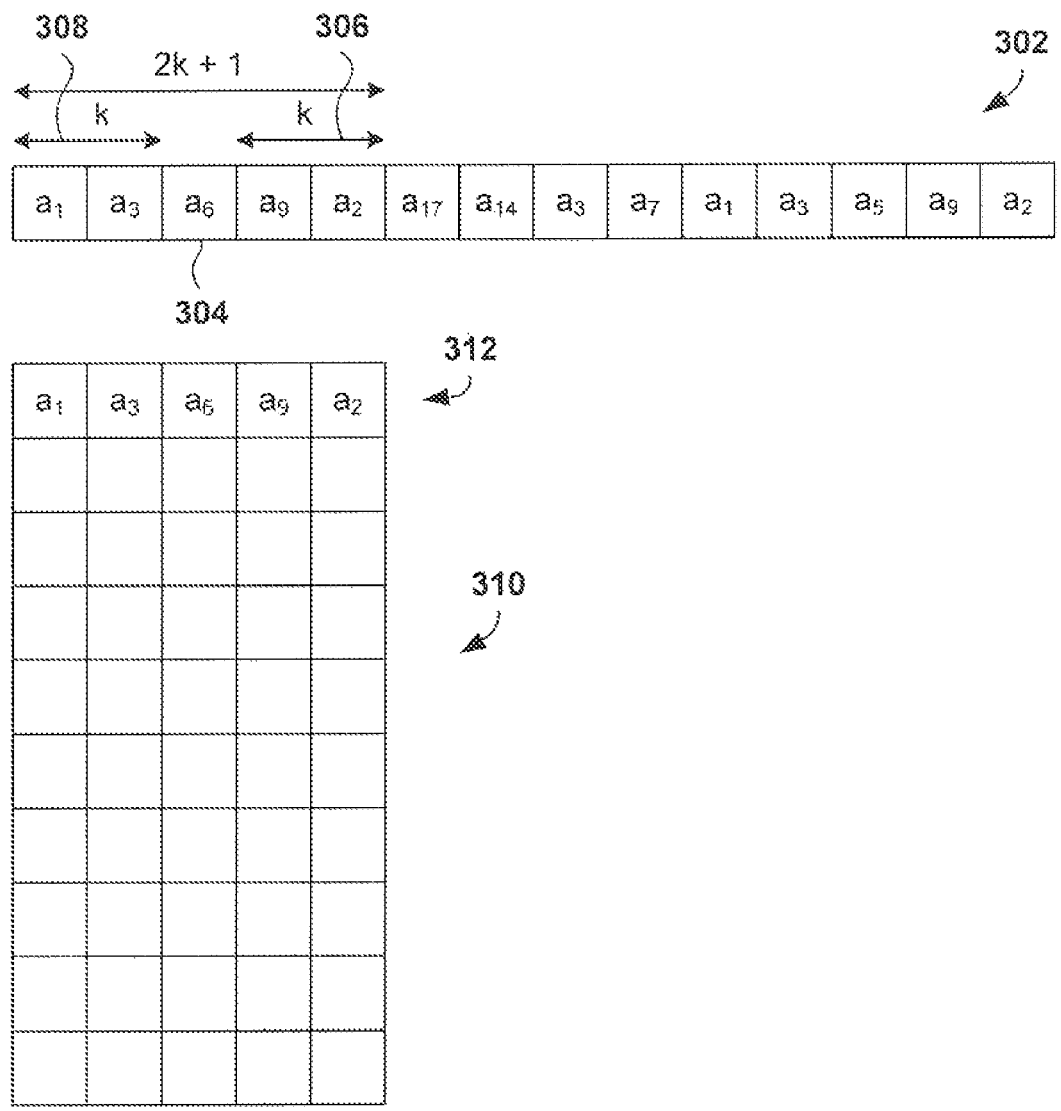
FIGS. 3A-D illustrate a context-based, sliding window approach by which a discrete denoiser characterizes the occurrences of symbols in a noisy signal.

In order to consider occurrences of symbols within contexts in the 1-dimensional-signal case, the DUDE needs to consider a number of symbols adjacent to each, considered symbol. FIGS. 3A-D illustrate a context-based, sliding window approach by which the DUDE characterizes the occurrences of symbols in a noisy signal. FIGS. 3A-D all employ the same illustration conventions, which are described for FIG. 3A, in the interest of brevity. In FIG. 3A, a noisy signal 302 is analyzed by DUDE in order to determine the occurrence counts of particular symbols within particular contexts within the noisy signal. The DUDE employs a constant k to describe the length of a sequence of symbols preceding, and the length of a sequence of symbols subsequent to, a particular symbol that, together with the particular symbol, may be viewed as a metasymbol of length 2 k+1. In the example of FIGS. 3A-D, k has the value "2." Thus, a symbol preceded by a pair of symbols and succeeded by a pair of symbols can be viewed as a five-symbol metasymbol. In FIG. 3A, the symbol "$a_6$" 304 occurs within a context of the succeeding k-length symbol string "$a_9a_2$" 306 and is preceded by the two-symbol string "$(a_1a_3$" 308. The symbol "$a_6$" therefore occurs at least once in the noisy signal within the context ["$a_1a_3$," "$a_9a_2$"], in other words, the metasymbol "$a_1a_3a_6a_9a_2$" occurs at least once in the noisy signal. The occurrence of this metasymbol within the noisy signal 302 is listed within a table 310 as the first five-symbol metacharacter 312.

Figure 3B:
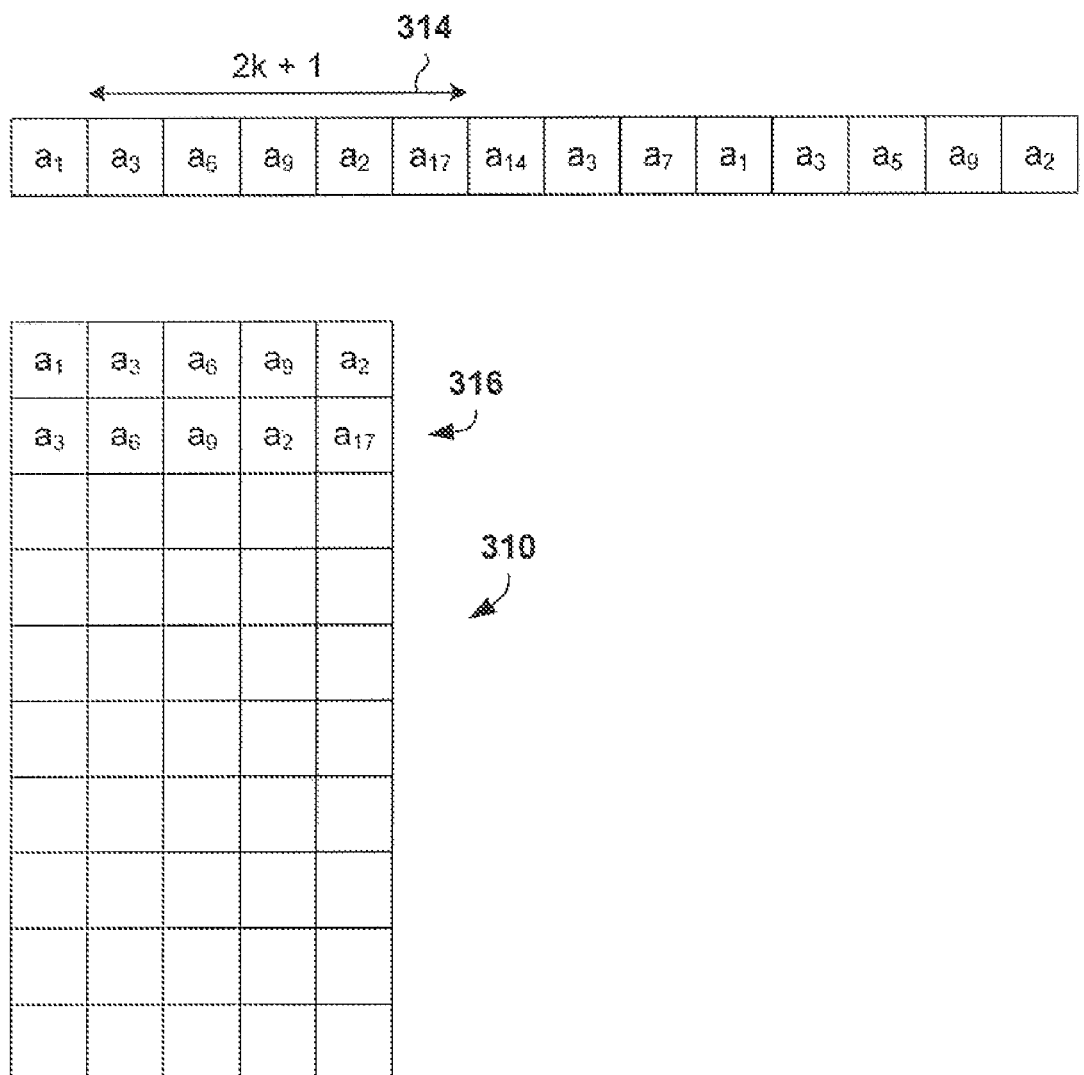
Figure 3C:
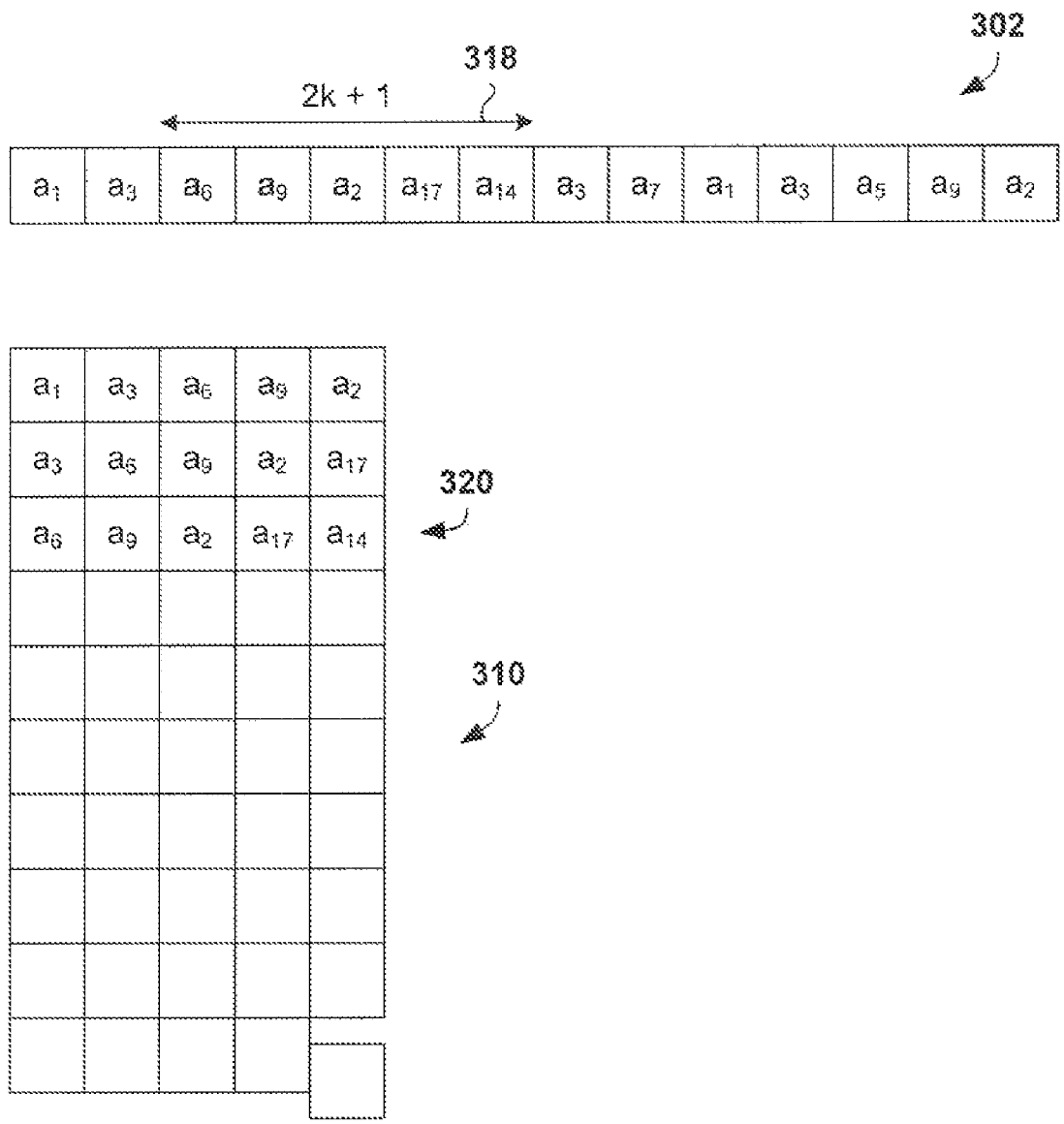
Figure 3D:
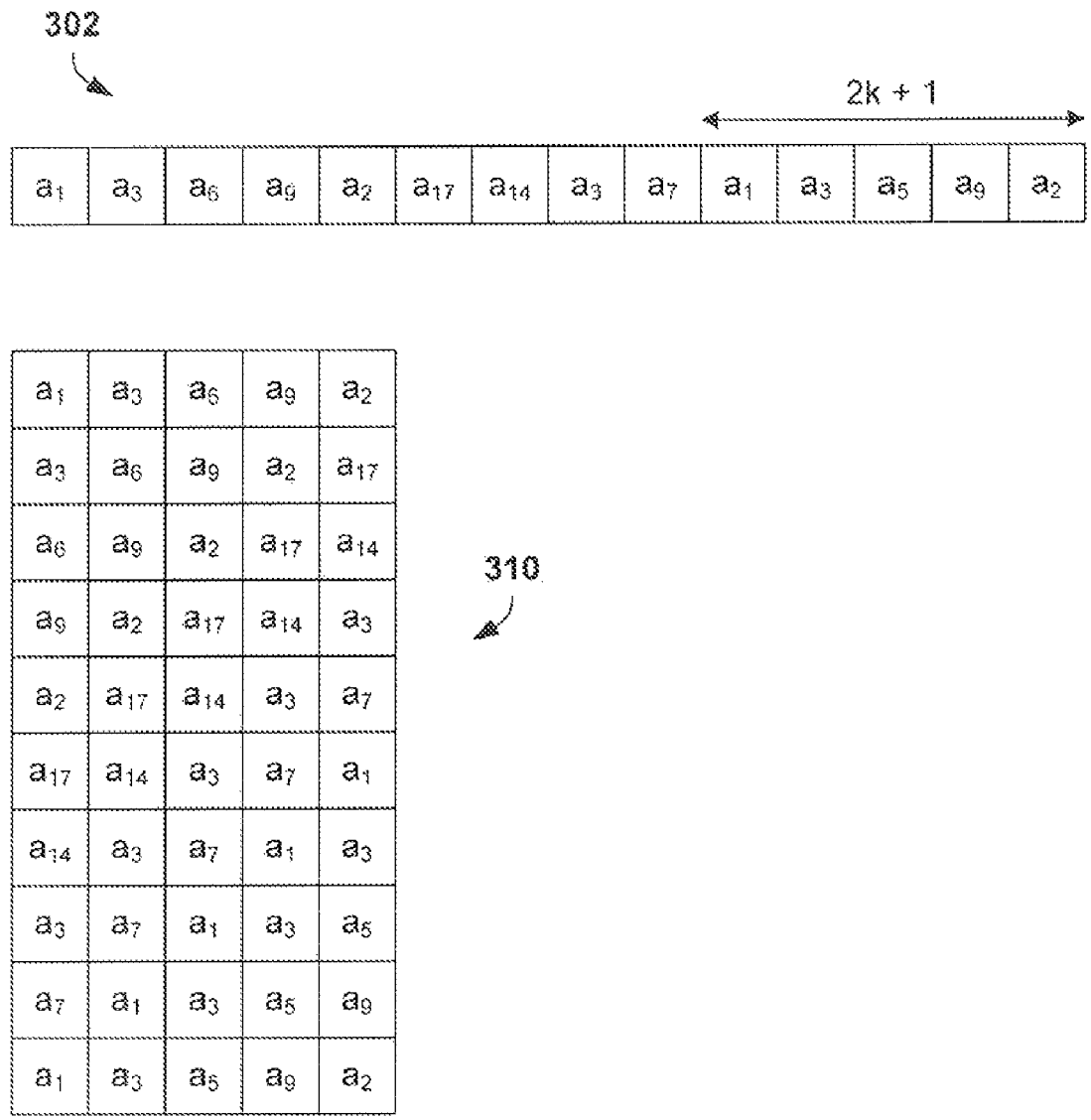

As shown in FIG. 3B, DUDE then slides the window of length 2 k+1 rightward, by one symbol, to consider a second metasymbol 314 of length 2 k+1. In this second metasymbol, the symbol "$a_9$" appears within the context ["$a_3a_6$," "$a_2a_{17}$"]. This second metasymbol is entered into table 310 as the second entry 316. FIG. 3C shows detection of a third metasymbol 318 in the noisy signal 302 and entry of the third metasymbol into table 310 as entry 320. FIG. 3D shows the table 310 following complete analysis of the short noisy signal 302 by DUDE. Although, in the examples shown in FIG. 3-D, DUDE lists each metasymbol as a separate entry in the table, in a more efficient implementation, DUDE enters each detected metasymbol once in an index table, and increments an occurrence count each time the metasymbol is subsequently detected. In this fashion, in a first pass, DUDE tabulates the frequency of occurrence of metasymbols within the noisy signal or, viewed differently, DUDE tabulates the occurrence frequency of symbols within contexts comprising k preceding and k subsequent symbols surrounding each symbol.

Figure 4:
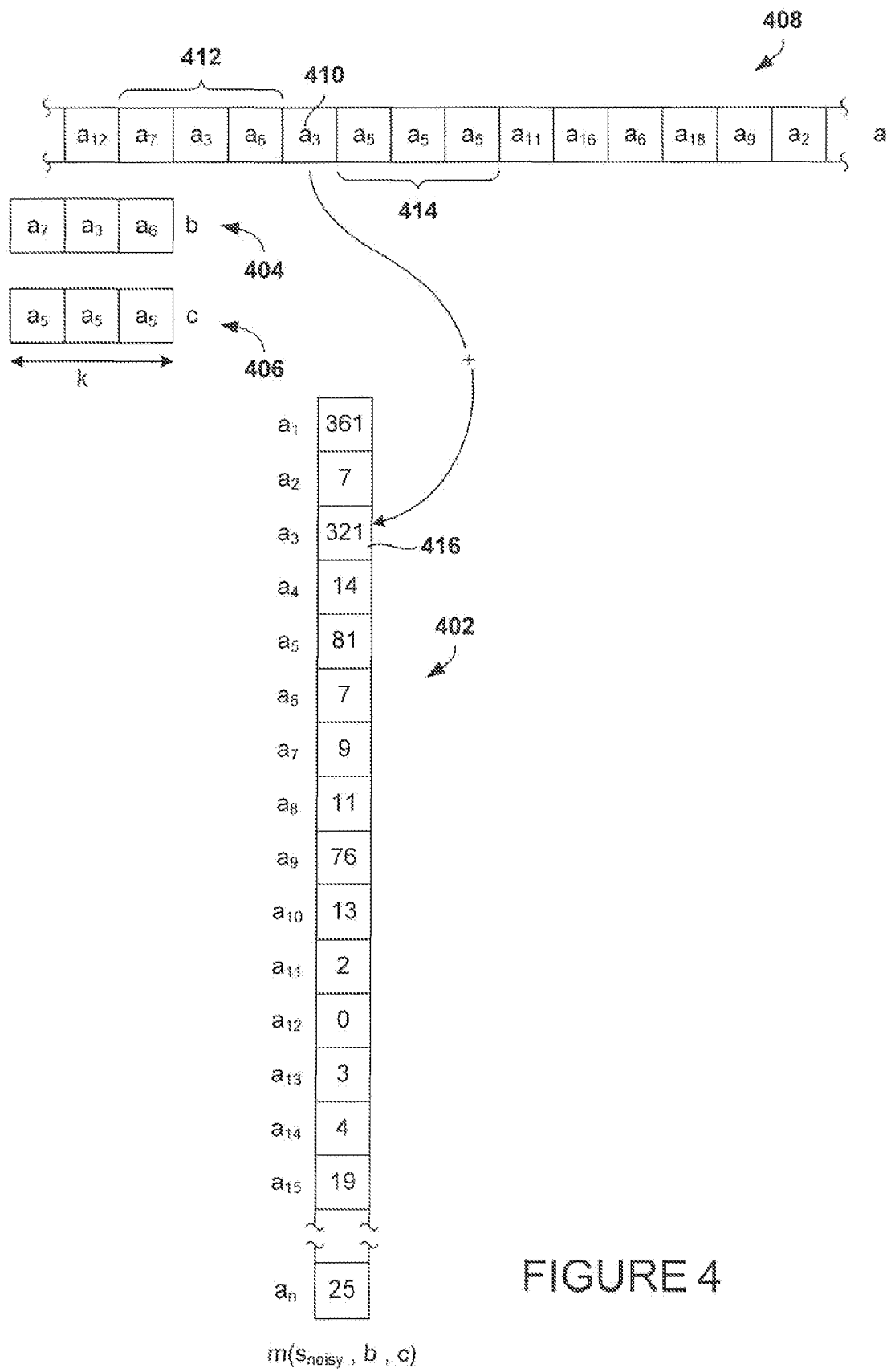
FIG. 4 illustrates a convenient mathematical notation and data structure representing a portion of the metasymbol table constructed by a discrete denoiser, as described with reference to FIGS. 3A-D.

FIG. 4 illustrates a convenient mathematical notation and data structure representing a portion of the metasymbol table constructed by DUDE, as described with reference to FIGS. 3A-D. The column vector $m(s_{noisy}, b, c)$ 402 represents a count of the occurrences of each symbol in the alphabet A within a particular context, represented by the k-length symbol vectors b and c, within the noisy signal $s_{noisy}$, where the noisy signal is viewed as a vector. In FIG. 4, for example, the context value for which the occurrence counts are tabulated in column vector $m(s_{noisy}, b, c)$ comprises the symbol vector 404 and the symbol vector 406, where k has the value 3. In the noisy signal $s_{noisy}$ 408, the symbol "$a_3$" 410 occurs within the context comprising three symbols 412 to the left of the symbol "$a_3$" 410 and three symbols 414 to the right of the symbol "$a_3$". This particular context has a value equal to the combined values of symbol vectors 404 and 406, denoted ["$a_7a_3a_6$," "$a_5a_5a_5$"] and this occurrence of the symbol "$a_3$" 410 within the context ["$a_7a_3a_6$," "$a_5a_5a_5$"], along with all other occurrences of the symbol "$(a_3$" in the context ["$a_7a_3a_6$," "$a_5a_5a_5$"], is noted by a count 416 within the column vector $m(s_{noisy}, b, c)$, with [b, c]=["$s_7s_3a_6$," "$a_5a_5a_5$"]. In other words, a symbol "$a_3$" occurs within the context ["$a_7a_3a_6$," "$a_5a_5a_5$"] in the noisy signal $s_{noisy}$ 321 times. The counts for the occurrences of all other symbols "$a_1$", "$a_2$", and "$a_4$"-"$a_n$" in the context ["$a_7a_3a_6$," "$a_5a_5a_5$"] within noisy signal $a_{noisy}$ are recorded in successive elements of the column vector $m(s_{noisy}, "a_7a_3a_6", "a_5a_5a_5")$. An individual count within a column vector $m(s_{noisy}, b, c)$ can be referred to using an array-like notation. For example, the count of the number of times that the symbol "$a_3$" appears in the context ["$a_7a_3a_6$," "$a_5a_5a_5$"] within the noisy signal $s_{noisy}$, 321, can be referred to as $m(s_{noisy}, "a_7a_3a_6", "a_5a_5a_5")[(a_3)]$.

DUDE employs either a full or a partial set of column vectors for all detected contexts of a fixed length 2 k in the noisy signal in order to denoise the noisy signal. Note that an initial set of symbols at the beginning and end of the noisy signal of length k are not counted in any column vector $m(s_{noisy}, b, c)$ because they lack either sufficient preceding or subsequent symbols to form a metasymbol of length 2 k+1. However, as the length of the noisy signal for practical denoising tasks tends to be quite large, and the context length k tends to be relatively small, DUDE's failure to consider the first and final k symbols with respect to their occurrence within contexts makes almost no practical difference in the outcome of the denoising operation.

Figures 5A, 5B:
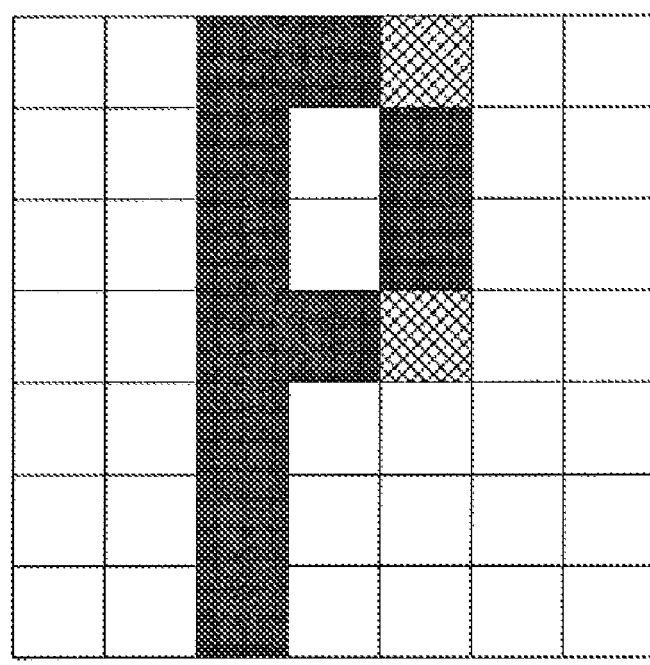
FIGS. 5A-D illustrate the concept of symbol-corruption-related distortion in a noisy or recovered signal.

FIGS. 5A-D illustrate the concept of symbol-corruption-related distortion in a noisy or recovered signal. The example of FIGS. 5A-D relates to a 256-value gray scale image of a letter. In FIG. 5A, the gray-scale values for cells, or pixels, within a two-dimensional image 502 are shown, with the character portions of the symbol generally having a maximum gray-scale value of 255 and the background pixels having a minimum gray-scale value of zero, using a convention that the displayed darkness of the pixel increases with increasing numerical value. Visual display of the image represented by the two-dimensional gray-scale signal in FIG. 5A is shown in FIG. 5B 504. The gray-scale data in FIG. 5A is meant to represent a low resolution image of the letter "P." As shown in FIG. 5B, the image of the letter "P" is reasonably distinct, with reasonably high contrast.

Figures 5C, 5D:
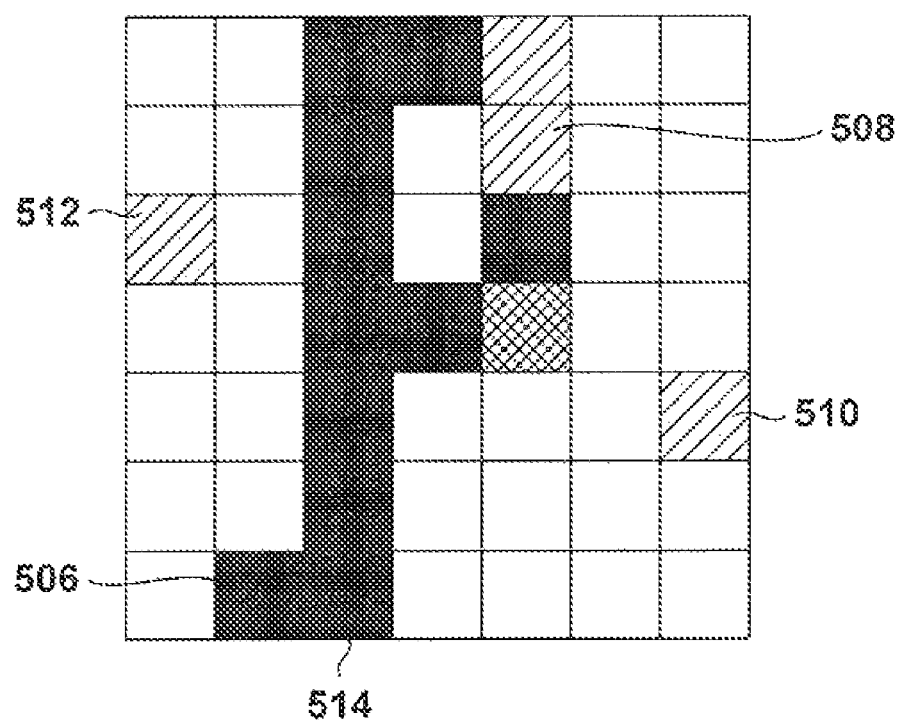

FIG. 5C shows the gray-scale data with noise introduced by transmission through a hypothetical noise-introducing channel. Comparison of FIG. 5C to FIG. 5A shows that there is marked difference between the gray-scale values of certain cells, such as cell 506, prior to, and after, transmission. FIG. 5D shows a display of the gray-scale data shown in FIG. 5C. The displayed image is no longer recognizable as the letter "P." In particular, two cells contribute greatly to the distortion of the figure: (1) cell 506, changed in transmission from the gray-scale value "0" to the gray-scale value "223"; and (2) cell 508, changed in transmission from the gray-scale value "255" to the gray-scale value "10." Other noise, such as the relatively small magnitude gray-scale changes of cells 510 and 512, introduce relatively little distortion, and, by themselves, would have not seriously impacted recognition of the letter "P." In this case, the distortion of the displayed image contributed by noise introduced into the gray-scale data appears to be proportional to the magnitude of change in the gray-scale value. Thus, the distorting effects of noise within symbols of a signal are not necessarily uniform. A noise-induced change of a transmitted symbol to a closely related, received symbol may produce far less distortion than a noise-induced change of a transmitted symbol to a very different, received symbol.

The DUDE models the non-uniform distortion effects of particular symbol transitions induced by noise with a matrix $\Lambda$. FIG. 6 displays one form of the symbol-transformation distortion matrix $\Lambda$. An element $d_{a_i \to a_j}$ of the matrix $\Lambda$ provides the relative distortion incurred by substituting the symbol "$a_j$" in the noisy or recovered signal for the symbol "$a_i$" in the clean signal. An individual column j of the matrix $\Lambda$ may be referred to as $\lambda_j$ or $\lambda_{a_j}$.

FIG. 7 illustrates computation of the relative distortion, with respect to the clean signal, expected from replacing a symbol "$a_\alpha$" in a received, noisy signal by the symbol "$a_x$." As shown in FIG. 7, element-by-element multiplication of the elements of the column vectors $\lambda_{a_x}$ and $\pi_{a_\alpha}$, an operation known as the Shur product of two vectors, and designated in the current discussion by the symbol $\odot$, produces the column vector $\lambda_{a_x} \odot \pi_{a_\alpha}$ in which the i-th element is the product of a distortion and probability, $d_{a_i \to a_x} p_{a_i \to a_\alpha}$, reflective of the relative distortion expected in the recovered signal by replacing the symbol $a_\alpha$ in the noisy symbol by the symbol "$a_x$" when the symbol in the originally transmitted, clean signal is "$a_i$."

FIG. 8 illustrates use of the column vector $\lambda_{a_x} \odot \pi_{a_\alpha}$ to compute a distortion expected for replacing "$a_\alpha$" in the metasymbol $ba_\alpha c$ in a noisy signal $s_{noisy}$ by the replacement symbol "$a_x$". In the following expression, and in subsequent expressions, the vectors $s_{noisy}$ and $s_{clean}$ denote noisy and clean signals, respectively. A different column vector q can be defined to represent the occurrence counts for all symbols in the clean signal that appear at locations in the clean signal that correspond to locations in the noisy signal around which a particular context [b, c] occurs. An element of the column vector q is defined as:

$$q(s_{noisy}, s_{clean}, b, c)[a_\alpha] = |\{i : s_{clean}[i] = a_\alpha, (s_{noisy}[i-k], s_{noisy}[i-k+1], \ldots s_{noisy}[i-1]) = b, (s_{noisy}[i+1], s_{noisy}[i+2], \ldots, s_{noisy}[i+k]) = c\}|.$$

where $s_{clean}[i]$ and $s_{noisy}[i]$ denote the symbols at location i in the clean and noisy signals, respectively; and $a_\alpha$ is a symbol in the alphabet A.

The column vector $q(s_{noisy}, s_{clean}, b, c)$ includes n elements with indices $a_\alpha$ from "$a_1$" to "$a_n$," where n is the size of the symbol alphabet A. Note that the column vector $q(s_{noisy}, s_{clean}, b, c)$ is, in general, not obtainable, because the clean signal, upon which the definition depends, is unavailable. Multiplication of the transpose of the column vector $q(s_{noisy}, s_{clean}, b, c)$, $q^T(s_{noisy}, s_{clean}, b, c)$, by the column vector $\lambda_{a_x} \odot \pi_{a_\alpha}$ produces the sum of the expected distortions in the column vector times the occurrence counts in the row vector that together provide a total expected distortion for replacing "$a_\alpha$" in the metasymbol $ba_\alpha c$ in $s_{noisy}$ by "$a_x$". For example, the first term in the sum is produced by multiplication of the first elements in the row vector by the first element in the column vector, resulting in the first term in the sum being equal to $q^T(s_{noisy}, s_{clean}, b, c)[a_1](p_{a_1 \to a\alpha} d_{a_1 \to ax})$ or, in other words, a contribution to the total distortion expected for replacing "$a_\alpha$" by "$a_x$" in all occurrences of $ba_\alpha c$ in $s_{noisy}$ when the corresponding symbol in $s_{clean}$ is $a_1$. The full sum gives the full expected distortion:

$$q^T(s_{noisy}, s_{clean}, b, c)[a_1](p_{a_1 \to a_\alpha} d_{a_1 \to a_x}) +$$
$$q^T(s_{noisy}, s_{clean}, b, c)[a_2](p_{a_2 \to a_\alpha} d_{a_2 \to a_x}) +$$
$$q^T(s_{noisy}, s_{clean}, b, c)[a_3](p_{a_3 \to a_\alpha} d_{a_3 \to a_x}) +$$
$$\vdots$$
$$q^T(s_{noisy}, s_{clean}, b, c)[a_n](p_{a_n \to a_\alpha} d_{a_n \to a_x})$$

As discussed above, DUDE does not have the advantage of knowing the particular clean signal, transmitted through the noise-introducing channel that produced the received noisy signal. Therefore, DUDE estimates the occurrence counts, $q^T(s_{noisy}, s_{clean}, b, c)$, of symbols in the originally transmitted, clean signal, by multiplying the row vector $m^T(s_{noisy}, b, c)$ by $\Pi^{-1}$ from the right. FIG. 9 shows estimation of the counts of the occurrences of symbols "$a_1$"-"$a_n$" for the clean signal.

The resulting expression $$m^T(s_{noisy}, b, c) \Pi^{-1} (\lambda_{a_x} \odot \pi s_{a_\alpha})$$

obtained by substituting $m^T(s_{noisy}, b, c) \Pi^{-1}$ for $q^T(s_{noisy}, s_{clean}, b, c)$ represents DUDE's estimation of the distortion, with respect to the originally transmitted clean signal, produced by substituting "$a_x$" for the symbol "$a_\alpha$" within the context [b, c] in the noisy signal $s_{noisy}$. DUDE denoises the noisy signal by replacing "$a_\alpha$" in each occurrence of the metasymbol $ba_\alpha c$ by that symbol "$a_x$" providing the least estimated distortion of the recovered signal with respect to the originally transmitted, clean signal, using the above expression. In other words, for each metasymbol $ba_\alpha c$, DUDE employs the following transfer function to determine how to replace the central symbol $a_\alpha$:

$$g_a^k(b, a_\alpha, c) = \operatorname*{argmin}_{a_x = a_1 \text{ to } a_n} [m^T(s_{noisy}, b, c) \Pi^{-1} (\lambda_{a_x} \odot \pi_{a_n})]$$

In some cases, the minimum distortion is produced by no substitution or, in other words, by the substitution $a_x$ equal to $a_\alpha$.

Figure 10:
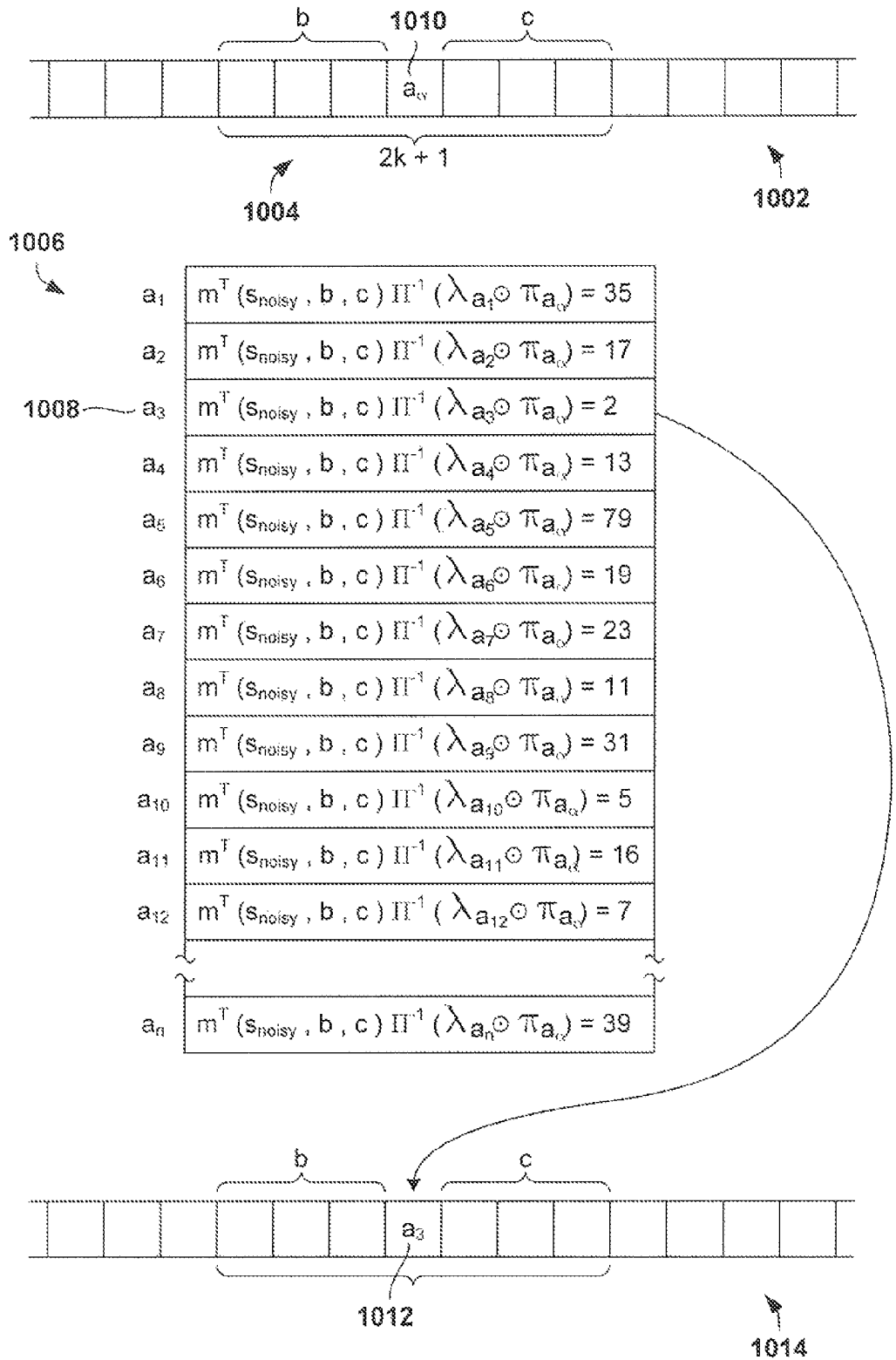
FIG. 10 illustrates the process by which a discrete denoiser denoises a noisy, received signal.

FIG. 10 illustrates the process by which DUDE denoises a noisy, received signal. First, as discussed above, DUDE compiles counts for all or a portion of the possible metasymbols comprising each possible symbol "$a_i$" within each possible context [b, c]. As discussed above, the counts are stored in column vectors m($s_{noisy}$,b,c). In the next pass, DUDE again passes a sliding window over the noisy signal 1002. For each metasymbol, such as metasymbol 1004, DUDE determines the relative distortions of the recovered signal with respect to the clean signal that would be produced by substituting for the central character of the metasymbol "$a_n$" each possible replacement symbol "$a_i$" in the range i=1 to n. These relative distortions are shown in table 1006 in FIG. 10 for the metasymbol 1004 detected in the noisy signal 1002. Examining the relative distortion table 1006, DUDE selects the replacement symbol with the lowest relative distortion, or, in the case that two or more symbols produce the same relative distortions, selects the first of the multiple replacement symbols with the lowest estimated distortion. In the example shown in FIG. 10, that symbol is "$a_3$" 1008. DUDE then replaces the central symbol "$a_\alpha$" 1010 in the noisy signal with the selected replacement symbol "$a_3$" 1012 in the recovered signal 1014. Note that the recovered signal is generated from independent considerations of each type of metasymbol in the noisy signal, so that the replacement symbol selected in a previous step does not affect the choice for a replacement symbol in a next step for a different metasymbol. In other words, the replacement signal is generated in parallel, rather than substitution of symbols directly into the noisy signal. As with any general method, the above-described method by which DUDE denoises a noisy signal can be implemented using various data structures, indexing techniques, and algorithms to produce a denoising method that has both linear time and linear working-data-set complexities or, in other words, the time complexity is related to the length of the received, noisy signal, by multiplication by a constant, as is the working-data-set complexity.

The examples employed in the above discussion of DUDE are primarily 1-dimensional signals. However, as also discussed above, 2-dimensional and multi-dimensional signals may also be denoised by DUDE. In the 2-and-multi-dimensional cases, rather than considering symbols within a 1-dimensional context, symbols may be considered within a contextual neighborhood. The pixels adjacent to a currently considered pixel in a 2-dimensional image may together comprise the contextual neighborhood for the currently considered symbol, or, equivalently, the values of a currently considered pixel and adjacent pixels may together comprise a 2-dimensional metasymbol. In a more general treatment, the expression $m^T(s_{noisy}, b, c)\Pi^{-1}(\lambda_{a_x} \odot \pi_{a_\alpha})$ may be replaced by the more general expression:

$$m^T(s_{noisy},\eta)\Pi^{-1}(\lambda_{a_x} \odot_{a_\alpha})$$

where η denotes the values of a particular contextual neighborhood of symbols. The neighborhood may be arbitrarily defined according to various criteria, including proximity in time, proximity in display or representation, or according to any arbitrary, computable metric, and may have various different types of symmetry. For example, in the above-discussed 1-dimensional-signal examples, symmetric contexts comprising an equal number of symbols k preceding and following a currently considered symbol compose the neighborhood for the currently considered symbol, but, in other cases, a different number of preceding and following symbols may be used for the context, or symbols either preceding or following a current considered symbol may be used.

Denoising Methods that Use Blended Counts

Although denoisers that represent examples of the present invention are applicable to denoising of signals comprising symbols from any arbitrary alphabet, examples are described below for binary signals comprising a sequence of the binary symbols "0" and "1." Certain aspects of binary-signal noise-introducing channel models are first discussed, below, prior to discussion of examples of the present invention.

Figure 11:
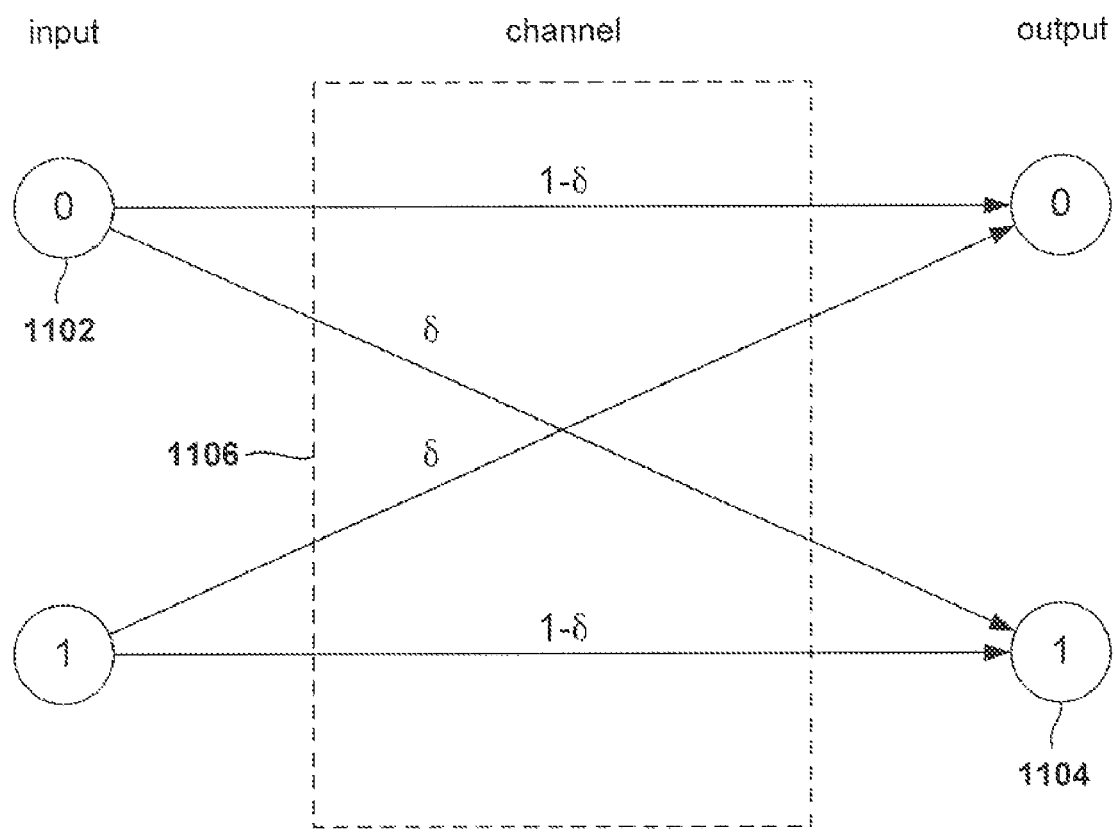
FIG. 11 illustrates one type of noise-introducing-channel model referred to as the binary symmetric channel ("BSC").

FIG. 11 illustrates one type of noise-introducing channel model referred to as the binary symmetric channel ("BSC"). The symbols of the input clean signal and the output noisy signal are the binary values "0" and "1." As shown in FIG. 11, there is a probability δ, referred to as the transition probability, that a particular input symbol will be corrupted by transition through the channel to the opposite symbol. As shown in FIG. 11, for example, there is a probability δ that an input symbol "0" 1102 will be corrupted to the symbol "1" 1104 as a result of being transmitted through the BSC 1106. Of course, the probability for reliable transmission of the input "0" symbol 1102 is simply 1-δ. The BSC is symmetric in that the transition probability δ is the same for corruption of an input "0" symbol to "1," and for corruption of an input symbol "1" to "0."

Figure 12:
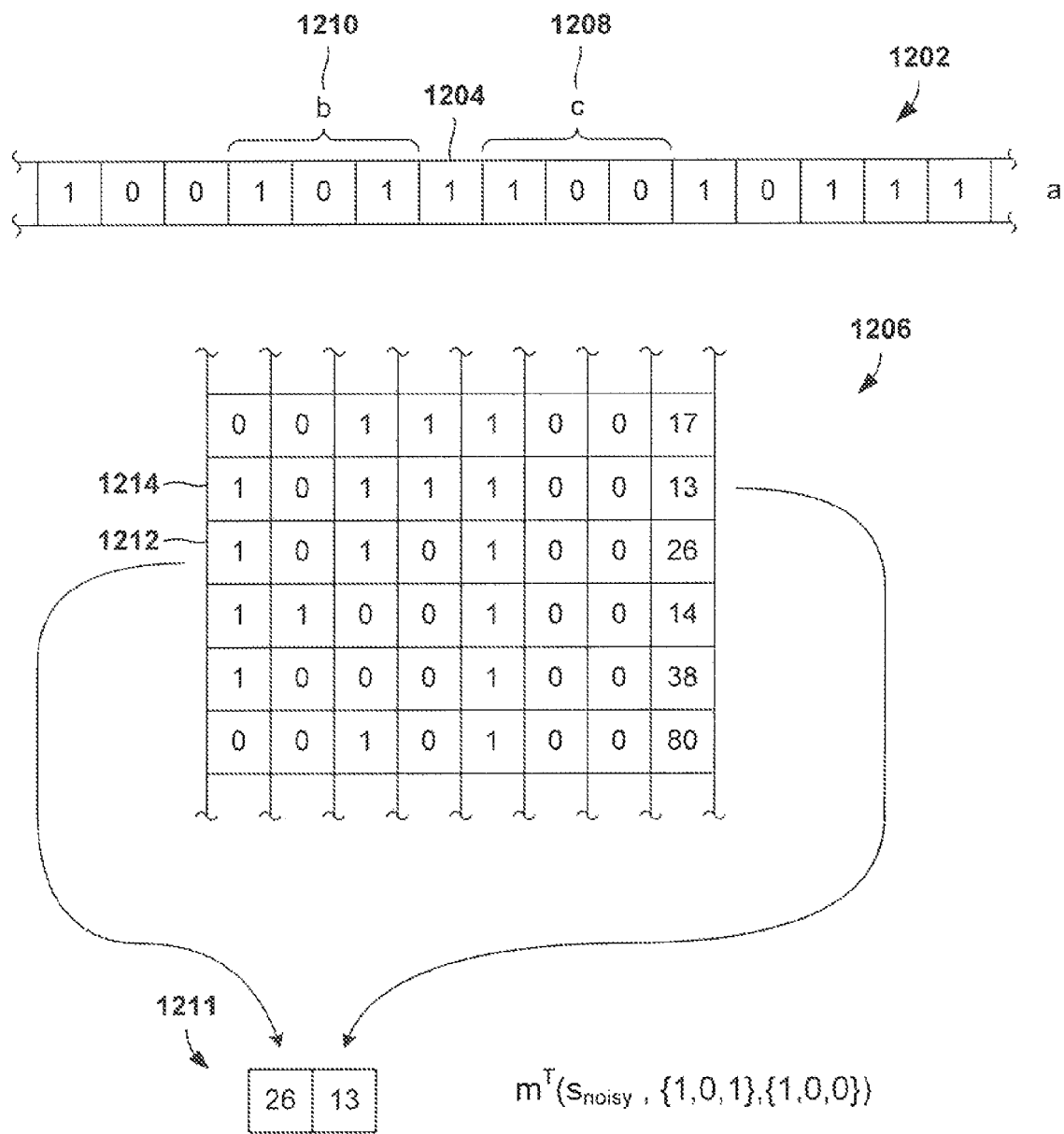
FIG. 12 illustrates construction of the row vector $m(s_{noisy}, b, c)$ by the DUDE in the case of a 1-dimensional, binary noisy signal.

FIG. 12 illustrates construction of the row vector m($s_{noisy}$, b, c) by the DUDE in the case of a 1-dimensional, binary noisy signal. As discussed above, DUDE makes a first pass over the noisy signal in order to accumulate counts, or numbers of occurrences, of particular metasymbols, or, in other words, the counts of symbols within particular contexts. As above, these accumulated counts are expressed in terms of the column vectors m($s_{noisy}$, b, c), where $s_{noisy}$ is the noisy input signal, and b and c are symbol vectors with values equal to those of symbol sequences of length k preceding and succeeding a central symbol, which comprise the context of that symbol. In a second pass, DUDE determines whether or not to replace a symbol in the noisy signal with a replacement symbol in part based on the number of occurrences of the symbol within the context in which it appears in the noisy signal. In FIG. 12, for example, the DUDE is making a second pass over the noisy signal 1202, and is currently considering symbol 1204. In the hypothetical case of FIG. 12, preceding and succeeding contexts of length 3 are employed to construct metasymbols of length 7. In the above-described implementation of DUDE, the DUDE would consult a table, a portion of which is shown in FIG. 12, in which the number of occurrences of particular metasymbols in the noisy signal are tabulated. From that table, the transpose of the column vector m($s_{noisy}$, b, c) can be constructed.

For example, in FIG. 12, the succeeding portion of the context with value c 1208 is {1,0,0} and the preceding portion of the context with value b 1210 is {1,0,1}. The row vector 1211, $m^T(s_{noisy}, \{1,0,1\}, \{1,0,0\})$, includes the count "26" from the entry 1212 corresponding to the metasymbol b0c, or "1,0,1,0,1,0,0" and the count "13" from the entry 1214 corresponding to metasymbol b1c, or "1,0,1,1,1,0,0."

As discussed above, the context dependent symbol counts acquired from a noisy signal are approximately related, via the matrix Π that describes the probabilities for symbol transitions due to transmission through the noise-introducing channel, to symbol counts within the originally transmitted, clean signal. However, it is also possible that transmission of the clean signal through the noise-introducing channel may corrupt not only the central symbol of a metasymbol, but may also corrupt one or more symbols within the 2 k-length context surrounding the central symbol. In that case, it may be more accurate to consider not only the number of occurrences of a particular metasymbol, but also the number of occurrences of a family of metasymbols similar to the particular metasymbol, when deciding whether or not to replace a symbol with a replacement symbol.

Figure 13:
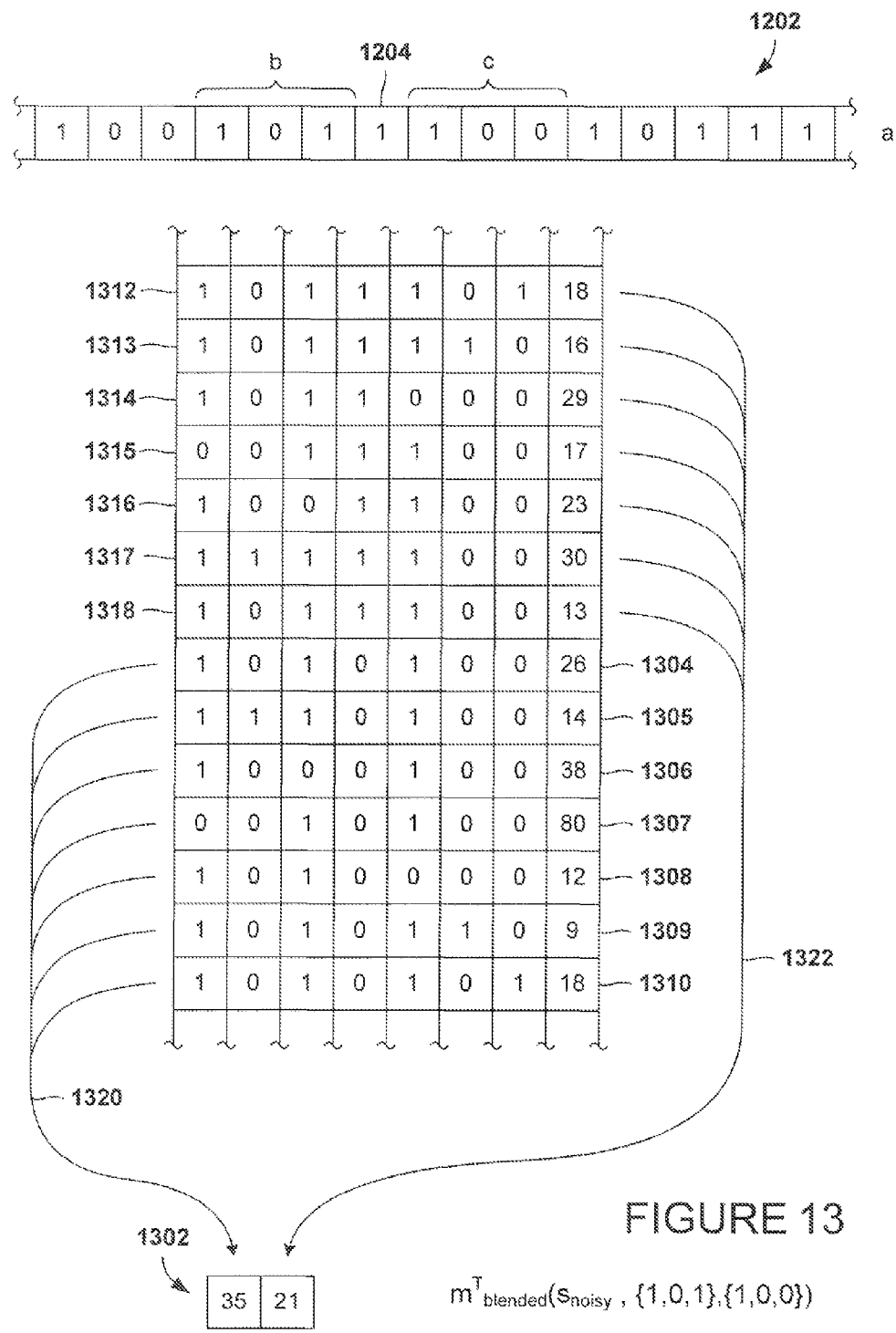
FIG. 13 illustrates a blended-count variant of the DUDE representing one example of the present invention that considers a family of related metasymbols, rather than a single metasymbol, in order to construct a blended-count row vector $m_{blended}^T(s_{noisy}, b, c)$.

FIG. 13 illustrates a blended-count variant of the DUDE representing one example of the present invention that considers a family of related metasymbols, rather than a single metasymbol, in order to construct a blended-count row vector $m_{blended}^T(s_{noisy}, b, c)$. FIG. 13 uses the same example as FIG. 12, in which the denoiser, during a second pass, needs to determine whether or not to replace symbol 1204 in the noisy signal 1202 with a replacement symbol. The blended-count variant of the DUDE ("blended-count DUDE") constructs the blended-count row vector $m_{blended}^T(s_{noisy}, b, c)$ 1302 by considering the occurrence counts within entries for a family of metasymbols 1304-1310 related to metasymbol b0c and a family of metasymbols 1312-1318 related to the metasymbol b1c, as indicated in FIG. 13 by the multiple-source arrows 1320 and 1322, respectively. In the example shown in FIG. 13, the metasymbols are related to one another in a family by the fact that each metasymbol in the family of metasymbols 1304-1310 has exactly one single-symbol transition, from binary symbol "0" to "1" or from binary symbol "1" to "0," with respect to a base metasymbol. In general, each metasymbol in a family of related metasymbols may be constructed from a base metasymbol $ba_\alpha c$ by substituting a replacement symbol for one or more symbols up to a fixed, maximum substitution limit, in the context portion of the metasymbol $ba_\alpha c$.

The technique for producing the blended counts, "35" and "21" in the example shown in FIG. 13, may include any reasonable combination of the occurrence counts for the metasymbols in a family of related metasymbols. One approach is to calculate the blended counts as a linear combination of counts as follows:

$$m_{blended}(s_{noisy}, b, c) = \sum_{b',c': d(bc,b'c') \leq threshold} m(s_{noisy}, b', c') w(bc, b'c')$$

where b' and c' are left and right context-sequence values related to b and c;

$m_{blended}(s_{noisy}, b, c)$ is the blended counts column vector for the base context [b, c];

$m(s_{noisy}, b', c')$ is the standard counts column vector for the context [b', c'];

w(bc, b' c') is the weight to be assigned to the counts contributed from $m(s_{noisy}, b', c')$; and d(bc, b' c') is a similarity metric indicating the relatedness of the context [b', c'] to the context [b, c].

The similarity metric d may be computed as the Hamming distance between two contexts, in the case of binary signals:

$$d(bc, b'c') = \text{number\_of\_1\_bits}(bc \text{ XOR } b'c')$$

where

XOR is the bitwise exclusive OR function; and number_of_1_bits is a function that returns the number of "1" bits in a binary number or string of binary values.

The weighting function w may be computed as the product of the BSC transition probability for a noise-introducing channel raised to two different exponents that depend on the similarity metric, as follows:

$$w(bc, b'c') = \delta^{d(bc,b'c')}(1-\delta)^{|bc|-d(bc,b'c')}$$

where

δ is the BSC transition probability; and

|bc| is the size, in symbols, of the context.

Finally, the threshold criterion for similarity may be computed as a constant r multiplied by the product of the BSC transition probability δ and the number of samples comprising the context, as follows:

r(#samples)δ

Thus, for example, the computation of the vector $m_{blended}^T(s_{noisy}, \{1,0,1\},\{1,0,0\})$ shown in FIG. 13 can be summarized, in terms of the above linear combination expression, as:

$$m_{blended} = m(s_{noisy},\{1,0,1\},\{1,0,0,\})w_{d=0}+$$

$$m(s_{noisy},\{1,1,1\},\{1,0,0,\})w_{d=1}+$$

$$m(s_{noisy},\{1,0,0\},\{1,0,0,\})w_{d=1}+$$

$$m(s_{noisy},\{0,0,1\},\{1,0,0,\})w_{d=1}+$$

$$m(s_{noisy},\{1,0,1\},\{0,0,0,\})w_{d=1}+$$

$$m(s_{noisy},\{1,0,1\},\{1,1,0,\})w_{d=1}+$$

$$m(s_{noisy},\{1,0,1\},\{1,0,1,\})w_{d=1}$$

where threshold=1.

Various other methods for computing the blended count vector $m_{blended}(s_{noisy},b,c)$ may be employed, including different linear combinations using different weighting functions in the similarity metrics, various other combinations, including nonlinear expressions having terms proportional to the occurrence counts for related metasymbols, and other approaches. A general expression for the blended count vector $m_{blended}(s_{noisy},b,c)$ is:

$$m_{blended}(s_{noisy},b,c) = f(S)$$

where $S \subseteq \{m_{blended}(s_{noisy}, x, y): d(bc, xy) \leq threshold\}$

In other words, the vector $m_{blended}(s_{noisy},b,c)$ is computed as some function of a set S, where S is an improper subset of the occurrence-count vectors for metasymbols comprising contexts similar, within a threshold similarity distance, to the context bc.

Once the blended-count vectors $m_{blended}(s_{noisy},b,c)$ have been computed, however that may be, the blended-count DUDE denoises the noisy signal in a second pass that is identical to the second pass of the (basic) DUDE with the exception that the vector $m_{blended}(s_{noisy},b,c)$ in the procedure used to compute the replacement symbol for a noisy symbol with context [b, c] is replaced by the corresponding blended-count vector $m_{blended}(s_{noisy},b,c)$.

Another way of looking at the blended-count DUDE is that because of noisy contexts the estimates of the counts of symbols in the clean signal having a particular context in the noisy signal should be reasonably continuous over a family of contexts similar to any particular context. By using blended counts, the estimated counts are more nearly continuous over families of contexts, improving the statistical reliability of the estimates of these counts.

Blended-count DUDE implementations may be used for denoising two-and-multi-dimensional signals, in addition to the 1-dimensional signals used as examples in the above discussion. In particular, blended counts may be computed using families of contexts based on multi-dimensional neighborhoods, regardless of how the contextual neighborhoods are defined. For example, a family of contexts may be defined as all single-symbol substitutions within a particular neighborhood, or may be defined on any other computable basis. In general, context families should be determined by probability distributions of context symbol replacements affected by noise-introducing channels, in order to provide reliable and accurate denoising.

A more general expression for the blended-counts vector $m_{blended}$ is:

$$m_{blended}(s_{noisy}, \eta) = \sum_{\kappa: d(\eta,\kappa) \leq threshold} m(s_{noisy}, \kappa) w(\eta, \kappa)$$

where $\kappa$ and $\eta$ are generalized contexts corresponding to the values of symbols in a contextual neighborhood about a reference symbol and where $m_{blended}(s_{noisy}, \eta)$ is the blended counts column vector for the base context $\eta$ containing the counts for each symbol a; in alphabet A in the context with value equal to $\eta$, or the counts for each a; in alphabet A in $\eta$;

$m(s_{noisy}, \kappa)$ is the standard counts column vector for the context $\kappa$;

$w(\eta, \kappa)$ is the weight to be assigned to the counts contributed from $m(s_{noisy}, \kappa)$; and $d(\eta, \kappa)$ is a similarity metric indicating the relatedness of the context $\kappa$ to the context $\eta$.

An even more general expression for the blended count vector $m_{blended}$ is:

$$m_{blended}(s_{noisy}, \eta) = f(S)$$

where $S \subset \{m(s_{noisy}, \kappa) : d(\eta, \kappa) \leq threshold\}$

Figure 14:
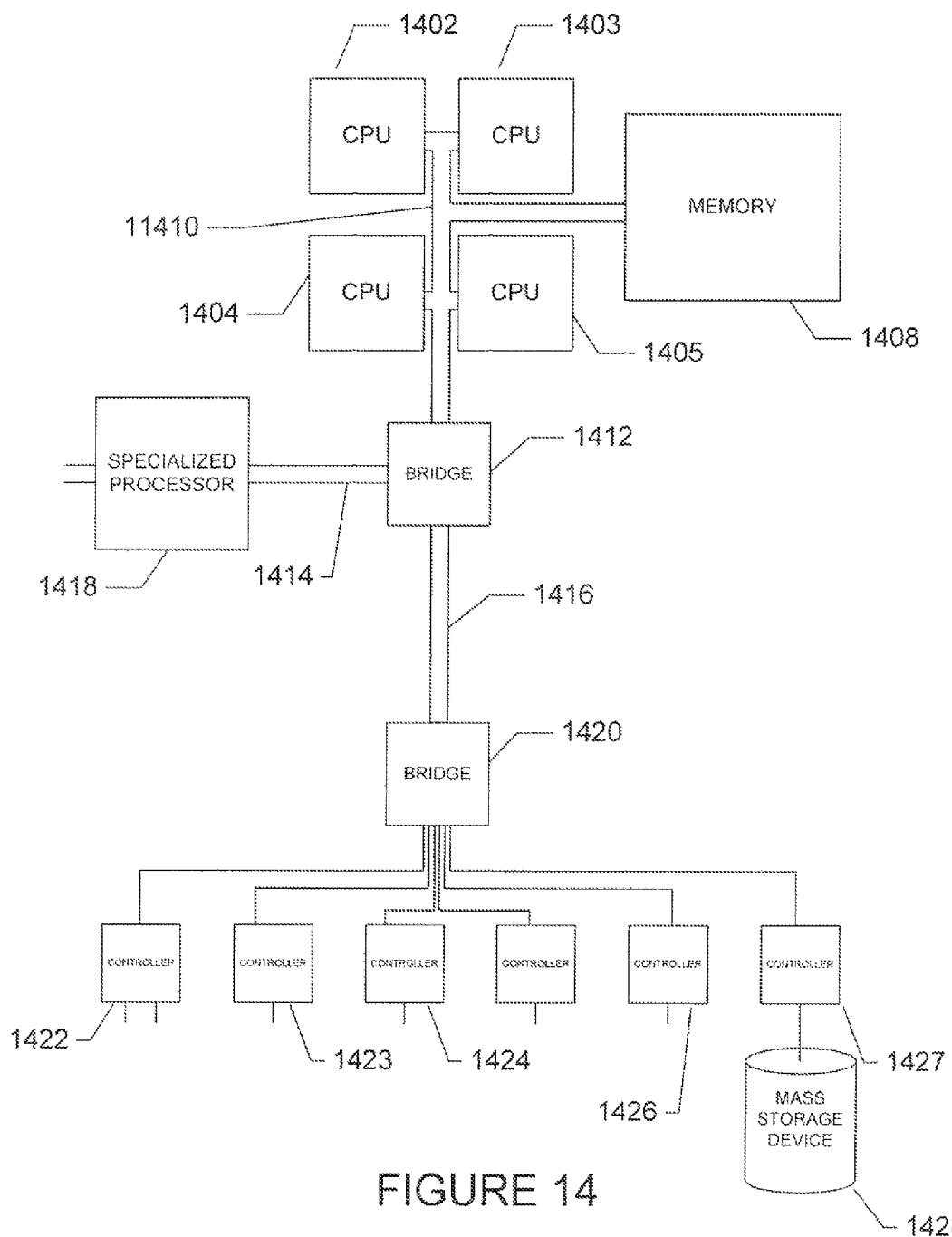
FIG. 14 illustrates a generalized architecture of a computer system that, when executing a software program that implements a blended-count denoiser, represents an example of the present invention.

FIG. 14 illustrates a generalized architecture of a computer system that, when executing a software program that implements a blended-count denoiser, represents an example of the present invention. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1402-1405, one or more electronic memories 1408 interconnected with the CPUs by a CPU/memory-subsystem bus 1410 or multiple busses, a first bridge 1412 that interconnects the CPU/memory-subsystem bus 1410 with additional busses 1414 and 1416, or other types of high-speed interconnection media, including multiple, high-speed serial interconnects. These busses or serial interconnections, in turn, connect the CPUs and memory with specialized processors, such as a graphics processor 1418, and with one or more additional bridges 1420, which are interconnected with high-speed serial links or with multiple controllers 1422-1427, such as controller 1427, that provide access to various different types of mass-storage devices 1428, electronic displays, input devices, and other such components, subcomponents, and computational resources.

Computer instructions that together comprise a software program that implements a blended-count denoiser may be stably stored in various types of computer-readable media, including mass-storage devices, such as mass-storage device 1428, removable data-storage media, such as removable optical and magnetic disks, and various types of electronic memories. Computer-readable media that store a sufficient number of instructions to implement even simple routines do not include propagating electromagnetic signals, as would be well understood by anyone with even cursory background in computing and engineering. Propagating electromagnetic signals are used to transmit data, and are not used to store data. As those with even cursory background in computer science and electronics would well understand by reading the description of the blended-count denoiser provided above, blended-count denoising can only be carried out, for even unrealistically small, example-signal denoising tasks, by automated computational methods. For example, as discussed above, a discrete denoiser employs matrix inversion and multiplication of vectors by matrices. Those with even cursory familiarity with mathematics and computing well understand that carrying out sequences of such operations is not possible by mental computation, and would take many orders of magnitude more time, by hand calculation, than would be acceptable or useful for real-world denoising tasks. Many denoising tasks require, for example, real-time or near-real-time performance, which means that hundreds of thousands to millions of individual calculations may need to be performed accurately in a span of one or several seconds. As those familiar with science and engineering well understand, no human calculation involving millions of individual steps can be performed without a significant frequency of errors, and in the types of computations involved in denoising, errors tend to propagate through a series of steps and grow increasingly serious and disruptive over the course of carrying out a complex computational method. Thus, hand calculation cannot be employed for carrying out denoising according to the present invention both because of the unacceptable level of errors that would accumulate as well as because of practical time constraints that cannot possibly be met by hand calculation. It is simply not possible to undertake discrete, blended-count denoising of even unrealistically tiny one-dimensional or higher-dimensional signals by mental calculation, and it is impossible to undertake discrete, blended-count denoising by mental or hand calculation within time constraints under which denoising is carried out.

Although the present invention has been described in terms of a particular embodiment, it is not intended that the invention be limited to this embodiment. Modifications within the spirit of the invention will be apparent to those skilled in the art. For example, a great many different methods for computing blended count vectors $m_{blended}(s_{noisy}, b, c)$ can be devised, based on consideration of the occurrence counts for meta-symbols with contexts similar to the context [b,c]. Although the blended count vector $m_{blended}(s_{noisy}, b, c)$ is used in the particular DUDE, described above, different blended count mathematical entities and data structures may be employed in different DUDE implementations. Computation of the blended count vector may include all occurrence counts for all metasymbols within a given, threshold similarity distance, may employ a subset of the similar metasymbols, or may employ all or a subset of related symbols within a more complex, hyperdimensional volume in similarity space that includes a considered metasymbol. Many different similarity metrics are possible, including distance-type metrics, such as the Hamming distance described above, or more complex similarity functions that incorporate estimated distortions and other considerations. The present invention is applicable to denoising signals comprising symbols selected from any arbitrary alphabet. The present invention is also applicable to denoisers that use variable-length contexts, and various other techniques not used by the DUDE described in a previous subsection. A denoiser incorporating blended counts, representing an example of the present invention, may be implemented as a software program that executes on a computer system, as a combination of executing software and hardware logic-circuits, in firmware, and in any device or medium in which received signals are denoised.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method, carried out by an electronic computer, for denoising a noisy signal, received through a noise-introducing channel, to produce a recovered signal, encoded in a non-transitory computer-readable medium, that more closely resembles an initially transmitted clean signal than the noisy signal, the method comprising:
   determining, by the electronic computer, symbol-transition probabilities for the noise-introducing channel;
   determining, by the electronic computer, a measure of distortion produced with respect to the clean signal by substituting a given replacement symbol for a given clean symbol;
   counting, by the electronic computer, occurrences of metasymbols in the noisy signal;
   replacing, by the electronic computer, symbols in the noisy signal by replacement symbols in the recovered signal that provide a smallest estimated distortion with respect to the clean signal, the distortion estimated for a given symbol replacement based on the determined symbol-transition probabilities, the determined measure of distortion, and a blending of occurrence counts of a related family of metasymbols in the noisy signal; and
   encoding, by the electronic computer, the recovered signal in the non-transitory computer-readable medium.

2. The method of claim 1 wherein determining the symbol-transition probabilities for the noise-introducing channel further includes determining a 2-dimensional matrix $\Pi$ containing matrix elements $\pi_{i,j}$ that represent a probability that clean signal symbol $a_i$, will be transmitted by the noise-introducing channel as symbol $a_j$, a column j in matrix $\Pi$ referred to as $\pi_j$ the symbols selected from an alphabet A containing the n symbols $\{a_1, \ldots, a_n\}$.

3. The method of claim 2 wherein determining a measure of the distortion produced with respect to the clean signal by substituting the given replacement symbol for the given clean symbol further includes determining a 2-dimensional matrix $\Lambda$ containing matrix elements $d_{a_i \to a_j}$ that represent a relative distortion incurred by substituting the symbol $a_j$ for the symbol $a_i$.

4. The method of claim 3 wherein the counts of occurrences of metasymbols are expressed as column vectors $m(s_{noisy},\eta)$, where $s_{noisy}$ is a vector representing the noisy signal and $\eta$ is the set of values of the symbols in a contextual neighborhood of a currently considered symbol $a_a$, a particular column vector $m(s_{noisy}, \eta)$ containing occurrence counts of the metasymbols $a_1$ in $\eta$, $a_2$ in $\eta$, ..., $a_n$ in $\eta$ in the noisy signal.

5. The method of claim 4 wherein the blended occurrence count of a family of metasymbols in the clean signal is expressed as:

$$m_{blended}(s_{noisy},\eta)=f(S)$$

wherein $S \subseteq \{m(s_{noisy}, \kappa):d(\eta, \kappa) \leq \text{threshold}\}$, $d(\eta, \kappa)$ is a similarity metric, and f(S) is a function that returns blended counts based on occurrence counts of metasymbols $a_a$ in $\kappa$ within a family of metasymbols related to metasymbol $a_a$ in $\eta$ by $d(\eta, \kappa)$.

6. The method of claim 5 wherein a replacement symbol $a_r$, is determined for a particular symbol $a_a$ by finding the symbol $a_r$, that provides a minimum value for the expression:

$$g_a^k(a_\alpha, \eta) = \frac{\text{argmin}}{a_x = a_1 \text{ to } a_n}[m_{blended}^T(s_{noisy}, \eta)\Pi^{-1}(\lambda_{a_x} \odot \pi_{a_a})].$$

7. The method of claim 1 wherein symbols in a family of metasymbols are related to one another by a similarity metric.

8. The method of claim 7 wherein the similarity metric is a Hamming distance.

9. The method of claim 7 wherein the similarity metric includes a term related to a distance in symbol space.

10. The method of claim 1 wherein the blended occurrence count of a metasymbol is a weighted sum of the occurrence counts of each metasymbol in the family of metasymbols.

11. The method of claim 10 wherein weights used in the weighted sum are related to symbol transition probabilities and a context size.

12. The method of claim 10 wherein the weights are expressed as:

$$w(\eta,\kappa)=\delta^{w(\eta,\kappa)}(1-\delta)^{|\eta|-d(\eta,\kappa)}$$

where
   $\delta$ is the BSC transition probability; and
   $|\eta|$ is a size of the context, in symbols.

13. A non-transitory computer readable medium that stores executable instructions that, when executed in a processing system, causes the processing system to perform a method for denoising a noisy signal comprising:
   determining by a processor symbol-transition probabilities for a noise-introducing channel;
   determining a measure of distortion produced with respect to a clean signal by substituting a given replacement symbol for a given clean symbol;
   counting occurrences of metasymbols in the noisy signal; and
   replacing symbols in the noisy signal by replacement symbols in a recovered signal that provide a smallest estimated distortion with respect to the clean signal, the distortion estimated for a given symbol replacement based on the determined symbol-transition probabilities, the determined measure of distortion, and a blending of occurrence counts of a related family of metasymbols in the noisy signal.

14. A denoiser that denoises a noisy signal, received through a noise-introducing channel, to produce a recovered signal that more closely resembles an initially transmitted clean signal than the noisy signal, the denoiser comprising:
   a component that stores symbol-transition probabilities for the noise-introducing channel in a computer-readable memory;
   a component that stores measures of distortion produced with respect to the clean signal by substituting a given replacement symbol for a given clean symbol in the memory;
   a component that stores occurrence counts of metasymbols in the noisy signal in the memory; and symbol replacement logic implemented in a processor that replaces symbols in the noisy signal by replacement symbols in the recovered signal that provide a smallest estimated distortion with respect to the clean signal, the distortion estimated for a given symbol replacement based on a blending of occurrence counts of a related family of metasymbols in the noisy signal.

15. The denoiser of claim 14 wherein the symbol-transition probabilities for the noise-introducing channel compose a 2-dimensional matrix $\Pi$ containing matrix elements $\pi_{i,j}$ that represent a probability that clean signal symbol $a_i$ will be transmitted by the noise-introducing channel as symbol $a_j$, a column j in matrix $\Pi$ referred to as $\pi_j$, the symbols selected from an alphabet A containing the n symbols $\{a_1, \ldots, a_n\}$.

16. The denoiser of claim 15 wherein measures of the distortion produced with respect to the clean signal by substituting the given replacement symbol for the given clean symbol compose a 2-dimensional matrix $\Lambda$ containing matrix elements $d_{a_i \to a_j}$ that represent a relative distortion incurred by substituting the symbol $a_j$ for the symbol $a_i$.

17. The denoiser of claim 16 wherein the counts of occurrences of metasymbols are expressed as column vectors $m(s_{noisy}, \eta)$, where $s_{noisy}$ is a vector representing the noisy signal and $\eta$ is the set of values of a contextual neighborhood of one or more symbols for a currently considered symbol $a_\alpha$, a particular column vector $m(s_{noisy}, \eta)$ containing occurrence counts of the metasymbols $a_1$ in $\eta$, $a_2$ in $\eta$, ..., $a_n$ in $\eta$ in the noisy signal.

18. The denoiser of claim 17 wherein the blended occurrence count of a family of metasymbols in the clean signal is expressed as:

$$m_{blended}(s_{noisy}, \eta) = f(S)$$

wherein $S \subseteq \{m(s_{noisy}, \kappa) : d(\eta, \kappa) \leq \text{threshold}\}$, $d(\eta, \kappa)$ is a similarity metric, and $f(S)$ is a function that returns blended counts based on occurrence counts of metasymbols $a_a$ in $\kappa$ within a family of metasymbols related to metasymbols $a_a$ in $\eta$ by $d(\eta, \kappa)$.

19. The denoiser of claim 18 that determines a replacement symbol $a_r$ for a particular symbol $a_\alpha$, by finding the symbol $a_r$ that provides a minimum value for the expression:

$$g_a^k(a_\alpha, \eta) = \frac{\text{argmin}}{a_x = a_1 \text{ to } a_n} [m_{blended}^T(s_{noisy}, \eta) \Pi^{-1}(\lambda_{a_x} \odot \pi_{a_a})].$$

20. The denoiser of claim 14 wherein the blended occurrence count of a metasymbol is a weighted sum of the occurrence counts of each metasymbol in the family of metasymbols.

21. The denoiser of claim 20 wherein weights used in the weighted sum are related to symbol transition probabilities and a context size.

22. The denoiser of claim 21 wherein the weights are expressed as:

$$w(\eta, \kappa) = \delta^{w(\eta,\kappa)} (1-\delta)^{|\eta| - d(\eta,\kappa)}$$

where $\delta$ is the BSC transition probability; and $|\eta|$ is the size of the context, in symbols.

\* \* \* \* \*

UNITED STATES PATENT AND TRADEMARK OFFICE
CERTIFICATE OF CORRECTION

PATENT NO. : 8,189,722 B2
APPLICATION NO. : 12/955860
DATED : May 29, 2012
INVENTOR(S) : Erik Ordentlich et al.

It is certified that error appears in the above-identified patent and that said Letters Patent is hereby corrected as shown below:

In the Claims

In column 15, line 47, in Claim 2, delete "$a_i$," and insert -- $a_i$ --, therefor.

In column 15, line 48, in Claim 2, delete "$\pi_j$" and insert -- $\pi_j$, --, therefor.

In column 15, line 59, in Claim 4, delete "$m(s_{noisy},\eta)$," and insert -- $m(s_{noisy}, \eta)$, --, therefor.

In column 15, line 62, in Claim 4, delete "$a_a$," and insert -- $a_\alpha$, --, therefor.

In column 15, line 63, in Claim 4, delete "$m(s_{noisy}, \eta)$containing" and insert -- $m(s_{noisy}, \eta)$ containing --, therefor.

In column 16, line 4, in Claim 5, delete "$a_a$" and insert -- $a_\alpha$ --, therefor.

In column 16, line 5, in Claim 5, delete "$a_a$" and insert -- $a_\alpha$ --, therefor.

In column 16, line 8, in Claim 6, delete "$a_r$," and insert -- $a_r$ --, therefor.

In column 16, line 9, in Claim 6, delete "$a_a$" and insert -- $a_\alpha$ --, therefor.

In column 16, line 10, in Claim 6, delete "$a_r$," and insert -- $a_r$ --, therefor.

In column 16, lines 12-14, in Claim 6, delete

" $$g_a^k(a_\alpha, \eta) = \underset{a_x = a_1 \text{ to } a_n}{\text{argmin}} [m_{blended}^T(s_{noisy}, \eta)\Pi^{-1}(\lambda_{a_x} \Box \pi_{a_a})].$$ ," and Signed and Sealed this
Sixth Day of August, 2013

Teresa Stanek Rea
*Acting Director of the United States Patent and Trademark Office*

CERTIFICATE OF CORRECTION (continued)
U.S. Pat. No. 8,189,722 B2 insert -- $g_a^k(a_a, \eta) = \dfrac{\text{argmin}}{a_x = a_1 \text{ to } a_n}[m_{blended}^T(S_{noisy}, \eta)\Pi^{-1}(\lambda_{a_x} \odot \pi_{a_a})].$ --, therefor.

In column 18, line 4, in Claim 18, delete "$a_a$" and insert -- $a_\alpha$ --, therefor.

In column 18, line 5, in Claim 18, delete "$a_a$" and insert -- $a_\alpha$ --, therefor.

In column 18, line 8, in Claim 19, delete "$a_\alpha$," and insert -- $a_\alpha$ --, therefor.

In column 18, lines 12-14, in Claim 19, delete

" $g_a^k(a_\alpha, \eta) = \dfrac{\text{argmin}}{a_x = a_1 \text{ to } a_n}[m_{blended}^T(S_{noisy}, \eta)\Pi^{-1}(\lambda_{a_x} \square \pi_{a_a})].$ ," and insert -- $g_a^k(a_\alpha, \eta) = \dfrac{\text{argmin}}{a_x = a_1 \text{ to } a_n}[m_{blended}^T(S_{noisy}, \eta)\Pi^{-1}(\lambda_{a_x} \odot \pi_{a_a})].$ --, therefor.